United States Patent
Huang

(10) Patent No.: US 10,887,817 B2
(45) Date of Patent: Jan. 5, 2021

(54) LOCATION-BASED NETWORK SYSTEM AND LOCATION-BASED COMMUNICATION METHOD

(71) Applicant: International Mobile IOT Corp, Taipei (TW)

(72) Inventor: Jung-Tang Huang, Taipei (TW)

(73) Assignee: INTERNATIONAL MOBILE IOT CORP., Taipei (TW)

( * ) Notice: Subject to any disclaimer, the term of this patent is extended or adjusted under 35 U.S.C. 154(b) by 169 days.

(21) Appl. No.: 14/730,913

(22) Filed: Jun. 4, 2015

(65) Prior Publication Data

US 2015/0358773 A1 Dec. 10, 2015

Related U.S. Application Data

(63) Continuation of application No. PCT/US2015/034022, filed on Jun. 3, 2015.

(30) Foreign Application Priority Data

Jun. 4, 2014 (TW) .............................. 103119388 A

(51) Int. Cl.
*H04W 40/02* (2009.01)
*H04L 12/733* (2013.01)
(Continued)

(52) U.S. Cl.
CPC ........... *H04W 40/02* (2013.01); *H04L 45/122* (2013.01); *H04L 45/16* (2013.01); *H04B 5/0062* (2013.01); *H04W 4/026* (2013.01); *Y02D 30/70* (2020.08)

(58) Field of Classification Search
CPC ....... H04W 4/02; H04W 4/026; H04W 40/02; H04W 45/122; H04W 45/16; H04W 64/00; H04W 5/0062; H04W 4/244; H04W 40/246; H04W 40/248; H04W 4/046; H04W 4/029; H04W 40/244; H04L 45/122; H04L 45/16; Y02D 70/42;
(Continued)

(56) References Cited

U.S. PATENT DOCUMENTS 7,075,427 B1 * 7/2006 Pace ....................... B61L 23/06
  246/125
7,139,820 B1 * 11/2006 O'Toole, Jr. .......... H04L 63/123
  709/223

(Continued)

FOREIGN PATENT DOCUMENTS

WO         03049405         6/2003

OTHER PUBLICATIONS

Nen-Chung Wang, Jong-Shin Chen, Yung-Fa Huang, Yu-Li Su, "A Power-Aware Multicast Routing Protocol for Mobile Ad Hoc Networks With Mobility Prediction" Wireless Peers Communication, Springer Science+Business Media, LLC, Jul. 13, 2007.*

(Continued)

*Primary Examiner* — George Eng
*Assistant Examiner* — Hung K Du
(74) *Attorney, Agent, or Firm* — JCIPRNET

(57) ABSTRACT

A location-based network system is provided. The location-based network system includes a plurality of communication nodes to transmit a data packet based on the location of each node and a distance between each node and a destination node. A location-based communication method is also provided.

19 Claims, 20 Drawing Sheets

(51) Int. Cl.
*H04L 12/761* (2013.01)
*H04B 5/00* (2006.01)
*H04W 4/02* (2018.01)

(58) Field of Classification Search
CPC .... Y02D 70/1262; Y02D 70/26; Y02D 70/30; Y02D 70/00; Y02D 70/166; Y02D 70/146; Y02D 70/22; Y02D 70/162; Y02D 70/164; Y02D 70/142; Y02D 70/144; Y02D 30/70; H04B 5/0062
See application file for complete search history.

(56) References Cited

U.S. PATENT DOCUMENTS

| | | | | |
|---|---|---|---|---|
| 9,036,509 | B1* | 5/2015 | Addepalli | H04W 4/046 370/259 |
| 2005/0169238 | A1* | 8/2005 | Yang | H04L 45/02 370/351 |
| 2006/0182126 | A1 | 8/2006 | Yuen et al. | |
| 2007/0150565 | A1 | 6/2007 | Ayyagari | |
| 2010/0142403 | A1* | 6/2010 | Baumgarth | H04L 41/0806 370/254 |
| 2010/0163621 | A1* | 7/2010 | Ben-Asher | G05D 1/0088 235/412 |
| 2010/0184369 | A1* | 7/2010 | Cho | H04B 7/15557 455/11.1 |
| 2011/0053493 | A1 | 3/2011 | Yanagihara | |
| 2011/0228696 | A1* | 9/2011 | Agarwal | H04L 41/12 370/253 |
| 2013/0155919 | A1* | 6/2013 | Jung | H04L 45/12 370/310 |
| 2013/0191066 | A1* | 7/2013 | Spillane | H02G 1/02 702/135 |
| 2013/0258878 | A1 | 10/2013 | Wakikawa | |
| 2014/0172193 | A1* | 6/2014 | Levien | B64C 39/024 701/2 |
| 2015/0109994 | A1* | 4/2015 | Wilkinson | H04W 40/246 370/328 |

OTHER PUBLICATIONS

Leapinglizard-ga, Using latitude, longitude, and altitude to determine distance, answers.google.com, Apr. 4, 2004.*
Valerie Alandzi, Proximity Aware Routing in Ad Hoc Networks, Journal of Computer Science, vol. 3, issue 7, 2007, p. 533-539, ISSN 154-3636, Canada.
"Search Report of Europe Counterpart Application", dated Apr. 5, 2018, p. 1-p. 13.

* cited by examiner

LOCATION-BASED NETWORK SYSTEM AND LOCATION-BASED COMMUNICATION METHOD

CROSS-REFERENCE TO RELATED APPLICATIONS

This application is a continuation of PCT/US15/34022 filed on Jun. 3, 2015, which claims priority to Taiwanese Patent Application No. 103119388 filed on Jun. 4, 2014, the contents of each application are incorporated by reference herein.

FIELD

The subject matter herein generally relates to network systems and communication methods, and particularly to location-based network systems and location-based communication methods.

BACKGROUND

With the development of network communication, sensing and electronic technology, a network system having multiple terminal devices (which are usually different types of sensors) and multiple transmission nodes has been widely used in a number of fields such as traffic control, environment monitoring, property management, health care, and other organizations. Generally, the terminal devices and the transmission nodes are limited in computing power, transmission capacity, and storage space. Therefore, the packet transmitted in the network or between the network may be easily lost, and the amount of information carried by the packet is smaller. The aforementioned network architecture is also known as low-power and lossy networks (LLNs).

Additionally, a mesh network with routing propagates the data packets along a path by hopping from node to node until the packets reach the destination, thus increasing the deliverability rate of the data packets. To ensure all path availability, the mesh network allows for continuous connections and reconfigures itself around broken paths by using self-healing algorithms.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

Figure 1:
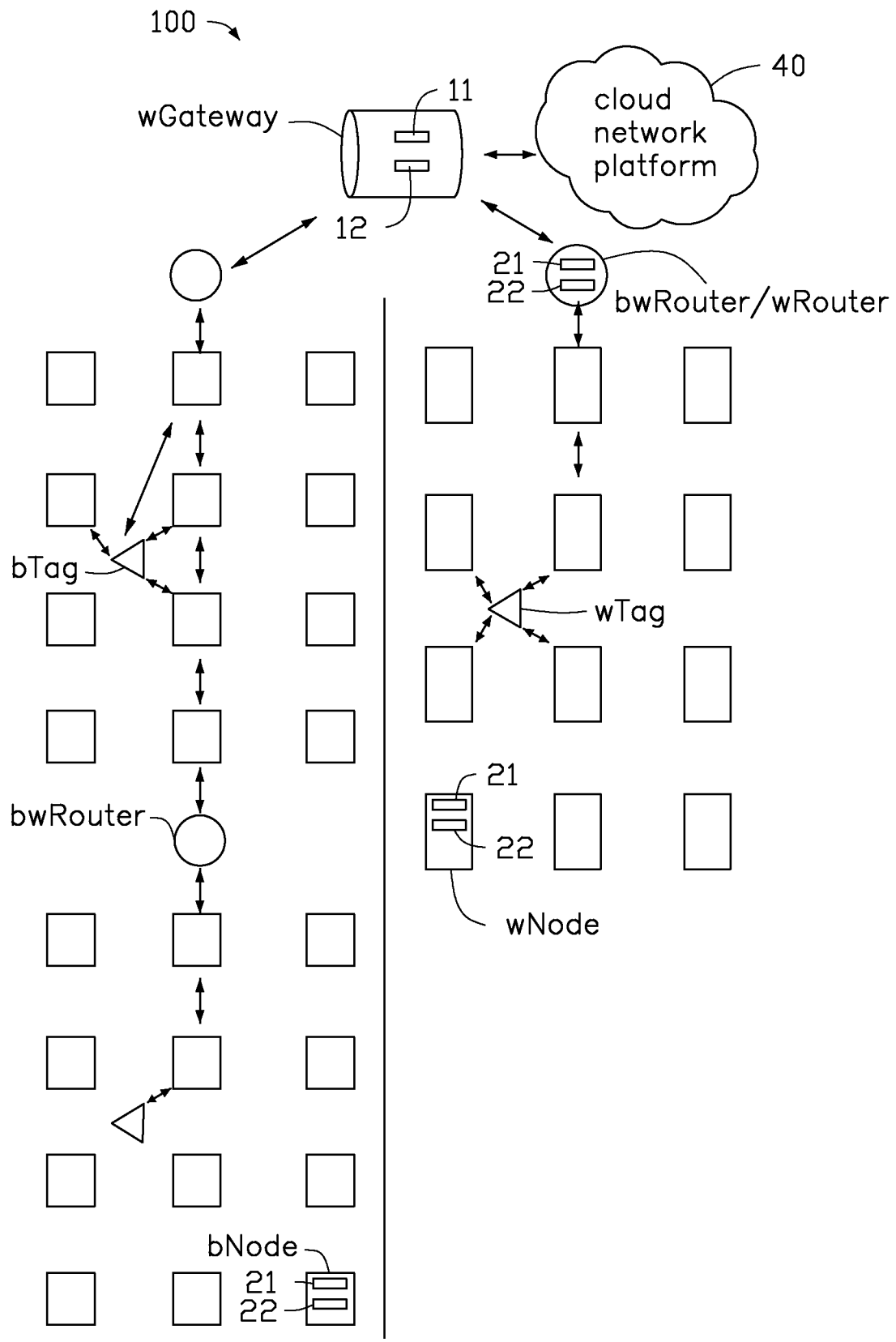
FIG. 1 is a schematic diagram illustrating a location-based network system according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

FIG. 1 is a schematic diagram illustrating a location-based network system according to an embodiment of the present disclosure. In FIG. 1, a location-based network system 100 includes at least one switch node bwRouter/wGateway and a plurality of communication nodes bNode/wNode. The switch nodes bwRouter/wGateway can receive data packets from at least one terminal device bTag/wTag through the communication nodes bNode/wNode, and further can transmit data packets to the at least one terminal device bTag/wTag through the communication nodes bNode/wNode. More specifically, the switch nodes bwRouter/wGateway can be further connected to a cloud network platform 40 so that the location-based network system 100 can transmit the data packets to the cloud network platform 40 or receive the data packets from the cloud network platform 40. The arrows in FIG. 1 represent a transmission direction of the data packets. Basically, the terminal device bTag, the communication node bNode, the switch node bRouter/bwRouter have a Bluetooth function, and the terminal device wTag, the communication node wNode, the switch node wRouter/bwRouter/wGateway have a WiFi function. The switch node bwRouter of FIG. 1 is able to replaced by the switch node wRouter to better construct the location-based network system 100.

The switch node bwRouter/wRouter can be a router, the switch node wGateway can be a gateway. Also, each switch node can include at least a communication module 11 and a processor 12. In this embodiment, the processor 12 can be a central processing unit, a digital signal processor, a single chip, a microprogrammed control unit (MCU), or a system on a chip (SOC). More specifically, the switch node bwRouter/wRouter/wGateway can use utility power or battery power as the power source and use its communication module to communicate with the communication nodes bNode/wNode and the cloud network platform 40. In addition, the communication of bwRouter is mainly based on the Bluetooth low energy (BLE) protocol and the WIFI protocol, and the communication of wGateway is mainly based on the WIFI protocol and/or the 3G/4G/5G mobile telecommunications technology.

The switch nodes bwRouter/wRouter/wGateway may utilize other protocols to communicate with the communication nodes bNode/wNode and the cloud network platform 40, such as the Bluetooth protocol, the ZigBee protocol, the ANT+ protocol, the worldwide interoperability for microwave access (WIMAX) protocol, and/or the long term evolution (LTE) protocol. Furthermore, the communication module in the switch nodes can be an integrated communication module adapted for a variety of protocols. For example, the communication module in the switch node bwRouter/wGateway can include a dual-band WIFI module and a dual-mode Bluetooth module. The dual-band WIFI module can work on both the 5 GHz band and the 2.4 GHz band and can be used in a long-distance wireless transmission. The dual-mode Bluetooth module can include a master module and a slave module and can be used in a short-distance wireless transmission. In addition, the switch nodes bwRouter/wRouter/wGateway can be connected to the cloud network platform in a wired manner (e.g., Ethernet or other fixed network protocols).

The communication nodes bNode/wNode can include at least a wireless communication module 21 and a processor 22. In this embodiment, the processor 12 may be a central processing unit, a digital signal processor, a single chip, a microprogrammed control unit (MCU), or a system on a chip (SOC). More specifically, the communication nodes bNode/wNode may use utility power as the main power source, but a variety of batteries may also serve as the power source. In the location-based network system 100, the communication node bNode performs data transmission and communicates with the other communication nodes, the switch nodes, or the terminal devices mainly based on the Bluetooth protocol or the Bluetooth low energy (BLE) protocol. However, in other embodiments, the communication node bNode may also perform data transmission with the other communication nodes, the switch nodes, or the terminal devices based on other protocols, such as the Zigbee protocol or the ANT+ protocol. Generally, the communication node bNode has a shorter effective transmission distance and thus needs to be disposed densely. On the other hand, the communication node wNode generally performs long-distance wireless transmission. In addition, the communication node wNode performs data transmission and communicate with the other communication nodes, the switch nodes, or the terminal devices mainly based on the WIFI protocol. Furthermore, the communication node wNode may perform data transmission and communicate with the other communication nodes, the switch nodes, or the terminal devices based on the IEEE 802.11ah protocol, which utilizes sub 1 GHz (such as 315 MHz, 433 MHz, 868 MHz, 915 Mhz) license-exempt bands to provide extended range WIFI networks. In other embodiments, the communication nodes bNode/wNode may be set up in groups, and digital information connection and exchange between the groups of the communication nodes may be realized by a universal asynchronous receiver/transmitter (UART), a serial peripheral interface bus (SPI Bus), an inter-integrated circuit (I2C) or in combo module such as Broadcom BCM4335, or Intel® Edison board.

In this embodiment, the switch nodes bwRouter/wRouter/wGateway and the communication nodes bNode/wNode are respectively installed on a plurality of facilities or a plurality of landmarks that have fixed locations. For example, the facilities may be indoor lighting apparatuses, street lights, traffic lights, home appliances or the like, and the landmarks may be railings, bulletin boards or the like. It should be noted that the present disclosure is not limited to the above. For example, the switch nodes and the communication nodes may be integrated with light emitting diodes (LED) to be disposed in indoor lighting apparatuses or street lights. On the other hand, the communication nodes may be a standalone communication module powered by a battery.

It should be noted that, during the installation process, it is important to install or dispose the switch nodes bwRouter/wRouter/wGateway and the communication nodes bNode/wNode at fixed geographic locations. Namely, the switch nodes and the communication nodes are installed or disposed at fixed longitudes, latitudes, and altitudes. During the installation process, the longitudes, latitudes, and heights of the switch nodes and those of the communication nodes are set up in the hardware respectively. In addition, the communication node is able to record the longitudes, latitudes, and heights of the neighboring switch nodes. Also, the latitude and longitude of the switch node or the communication node may be set up by using a built-in global positioning system (GPS) module.

The terminal device bTag/wTag connected to the location-based network system 100 may be a mobile communication device, a wearable sensing device, an implantable sensing device, a home appliance, a fixed sensing device, a stationary actuating device or the like. However, it should be noticed that the present disclosure is not limited to the above. More specifically, the mobile communication device may be a portable electronic device, such as a mobile phone, a tablet computer, or a laptop computer. The mobile communication device connected to the location-based network system 100 may send a call or a text message to the cloud network platform 40 or other mobile communication devices through the switch nodes bwRouter/wRouter/wGateway and the communication nodes bNode/wNode. In addition, the mobile communication device may use various applications that require network connection based on the location-based network system 100.

In addition, the wearable sensing device may be a sensing device worn by the user for measuring physiological parameters, such as a sphygmomanometer, an oximeter, a plantar pressure sensor, a brain wave sensor, a gyroscope, or a triaxial accelerometer. And the implantable sensing device may be an implantable ECG sensor. Thus, the location-based network system 100 can be a part of a medical monitoring infrastructure for assisting a hospital or a doctor to monitor the health status of patients at any time. Various physiological parameters obtained by the wearable sensing device can be transmitted to a medical monitoring system built on the cloud network platform 40 via the location-based network system 100.

Moreover, the home appliance may be a home electronic product, such as a refrigerator, an air conditioner, a fan, or a TV. The fixed sensing device may be a sensing device (e.g., a thermometer, a hygrometer, a manometer, or a luminance meter) installed in a room or on a variety of furniture (e.g., a wash basin, a toilet, a closest, a bathroom, a ceiling, a wall, a chair, or a bed) for measuring environmental parameters. Moreover, the fixed sensing device may be a magnetic reed switch installed on a handle of a refrigerator, a drawer, a window, a locker, a faucet, a gas switch and other devices that open and close. By connecting the home appliances, the fixed sensing devices, and the stationary actuating devices to the location-based network system 100, a smart home environment could be realized, thus making a user monitor and control the home environment via the location-based network system 100.

It should be noticed that the terminal device bTag can be a RFID tag attached on objects (i.e., tools, consumables and goods of a business abode, a factory and a family), persons (i.e., the children, the aged, and the foreign domestic workers), or animals (e.g., pets, zoo animals, forest animals), and other objects that communication or location is desired. The communication node bNode can include or combine with a UHF RFID reader to read the RFID tags attached on the objects, the persons, and the animals. Once the at least one communication node bNode read the RFID tag, the at least one communication nodes bNode transmits the latitude, longitude, and altitude of itself to the cloud network platform or a server by using the location-based network system 100, thus obtaining the location of the RFID tag attached on the object, the person, or the animal. If there are at least three communication nodes bNode that read a same RFID tag at the same time, the cloud network platform or the server can accurately calculate the location of the RFID tag by using triangulation technology. On the other hand, the RFID tag may include data related to the latitude, longitude, and altitude where the object should be located. Thus, when the RFID reader reads and transmits the latitude, longitude, and altitude where the object should be located to the cloud network platform or the server, the cloud network platform or the server can direct an operator or a robot to place the object having an attached RFID tag in or at the corresponding place.

The UHF RFID reader may be combined to the communication node bNode by a universal serial bus (USB), a universal asynchronous receiver/transmitter (UART), a serial peripheral interface bus (SPI Bus), an inter-integrated circuit (I2C), or the like. For example, the UHF RFID reader may utilize a PR9200 UHF RFID Reader Chip—Phychips, a AS3993 UHF RFID Single Chip Reader EPC Classl—Ams, or RFID Reader Chips—Indy.

The above use of the RFID tag and the RFID reader may be realized in a business management field where the cloud network platform may help obtain the location, the inventory level and/or operation parameters of the tools/goods, or may be realized in a home monitoring field where the cloud network platform may help monitor the location and physiological states of the child, the aged, the pet.

Also, it should be noticed that the terminal device bTag further may include or combine with a visible light communication (VLC) sensor tag, and the communication node bNode may include or combine with a VLC transceiver. The VLC transceiver may be combined to the communication node bNode by a universal serial bus (USB), a universal asynchronous receiver/transmitter (UART), a serial peripheral interface bus (SPI Bus), an inter-integrated circuit (I2C), or the like. Once the at least one communication node bNode read the VLC sensor tag, the at least one communication node bNode transmits the latitude, longitude, and altitude of itself to the cloud network platform or a server by using the location-based network system 100, thus obtaining the location of the VLC sensor tag attached on the object, the person, or the animal. If there are at least three communication nodes bNode read a same VLC sensor tag at the same time, the cloud network platform or the server can accurately calculate the location of the VLC sensor tag by using triangulation technology.

On the other hand, the VLC sensor tag may be replaced by a camera of a mobile phone, so that the location of the mobile phone can be calculated by using triangulation technology, for example, based on the latitudes, longitudes and altitudes of communication nodes bNodes.

In this embodiment, the terminal device bTag may use a variety of batteries as the power source and perform data transmission and communicate with the communication nodes based on the Bluetooth protocol, the Bluetooth low energy (BLE) protocol, the WIFI protocol, the Zigbee protocol, or the ANT+ protocol, for example. However, it should be noted that the terminal device bTag is not limited to the above. In other embodiments, the terminal device bTag may serve as a router and be connected to the cloud network platform 40. The terminal device bTag performs data transmission and communicates with the cloud network platform based on the worldwide interoperability for microwave access (WIMAX) protocol, the long term evolution (LTE) protocol, the Bluetooth low energy (BLE) protocol, or the WIFI protocol, for example. In other words, the wireless communication module in the terminal device bTag may be an integrated wireless communication module adapted for a variety of protocols. In another embodiment of the present disclosure, the fixed-type terminal devices bTag, such as a home appliance or a fixed sensing device on furniture, may serve as the communication node bNode for improving the reliability of the location-based network system 100.

FIG. 2A to FIG. 2E are schematic diagrams illustrating an operation of a location-based network system according to an embodiment of the present disclosure. A method for transmitting data in the location-based network system is explained below with reference to FIG. 2A to FIG. 2E. With reference to FIG. 1 and FIG. 2A to FIG. 2E, in the embodiment, the location-based network system 100 transmits data packets from a terminal device bTag1 to a switch node bwRouter1 via communication nodes bNode1-bNode9. The communication nodes bNode1-bNode9 may be respectively operated in one of the master mode and the slave mode. In this embodiment, each of the communication nodes bNode1-bNode9 may include at least a communication module and a processor. The processor is configured to switch the operation mode of the communication node between the master mode and the slave mode. In this embodiment, the processor may be a central processing unit, a digital signal processor, a single chip, a microprogrammed control unit (MCU), or a system on a chip (SOC). When the communication nodes (e.g., the communication nodes bNode2-bNode6 of FIG. 2A) operate in the master mode, the communication nodes bNode2-bNode6 respectively monitor other communication nodes so as to receive the data packet from other communication nodes (e.g., the communication node bNode1 of FIG. 2A) that operates in the slave mode. In general, the communication node bNode usually operates in the master mode so as to constantly monitor whether any data packet is to be transmitted. However, it should be noted that the present disclosure is not limited to the above.

After the communication nodes bNode2-bNode6 receive the data packet from the communication node bNode1, the processor of each of the communication nodes bNode2-bNode6 further recognizes a destination node of the data packet. In FIG. 2A to FIG. 2E, the destination node of the data packet is the switch node bwRouter1. Then, the processor of each of the communication nodes bNode2-bNode6 determines whether the operation mode should switch to the slave mode according to the actual distance between its communication node and the switch node bwRouter1, and the actual distance between the communication node bNode1 and the switch node bwRouter1.

Figure 2A:
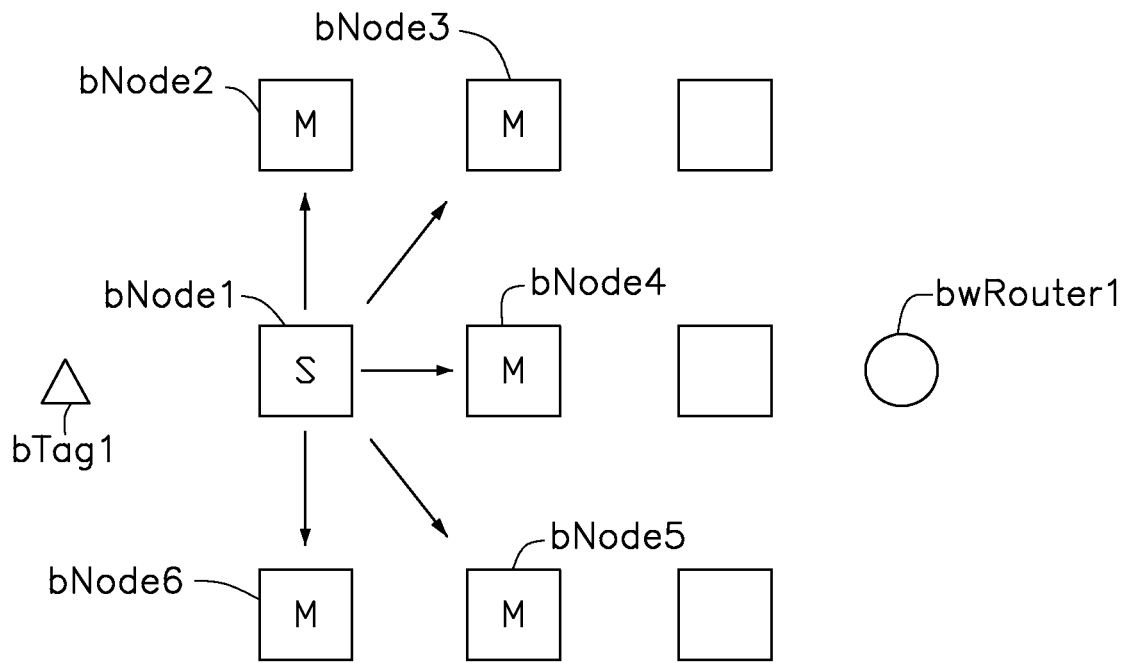
FIG. 2A to FIG. 2E are schematic diagrams illustrating an operation of a location-based network system according to a first embodiment of the present disclosure.
Figure 2B:
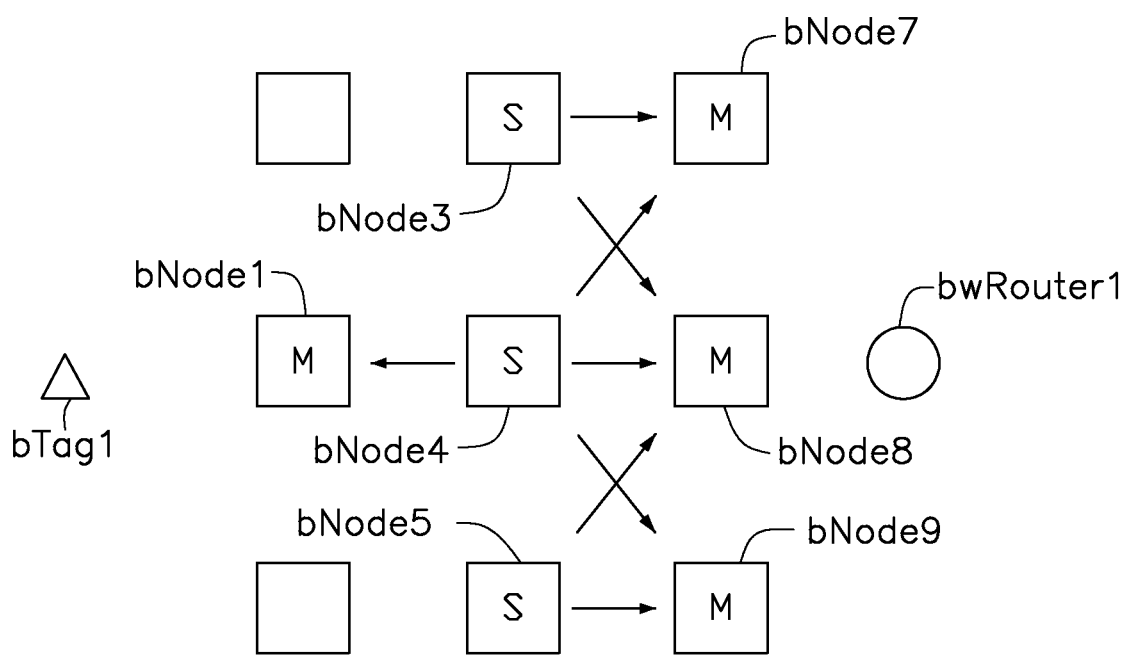

For example, the actual distance between the communication node bNode3 and the switch node bwRouter1, the actual distance between the communication node bNode4 and the switch node bwRouter1, and the actual distance between the communication node bNode5 and the switch node bwRouter1 are all shorter than the actual distance between the communication node bNode1 and the switch node bwRouter1, so, as shown in FIG. 2B, the communication nodes bNode3, bNode4, and bNode5 switch to the slave mode. When the communication nodes bNode3, bNode4, and bNode5 operate in the slave mode, the communication nodes bNode3, bNode4, and bNode5 broadcast the data packet. On the other hand, the actual distance between the communication node bNode2 and the switch node bwRouter1, and the actual distance between the communication node bNode6 and the switch node bwRouter1 are longer than the actual distance between the communication node bNode1 and the switch node bwRouter1, so the communication nodes bNode2 and bNode6 continue to operate in the master mode. Thus, the communication nodes bNode2 and bNode6 do not broadcast the data packet. Then, as shown in FIG. 2C, after broadcasting the data packet, the operation modes of the communication nodes bNode3, bNode4, and bNode5 switch back to the master mode and monitor other communication nodes.

Likewise, after the communication nodes bNode7-bNode9 receive the data packet, the communication nodes bNode7-bNode9 further recognize the destination node (i.e. the switch node bwRouter1) of the data packet. Then, the processor of each of the communication nodes bNode7-bNode9 respectively determines whether the operation mode should switch to the slave mode according to the actual distance between its communication mode and the switch node bwRouter1, and the actual distances between the communication nodes bNode3-bNode5 and the switch node bwRouter1.

Figure 2C:
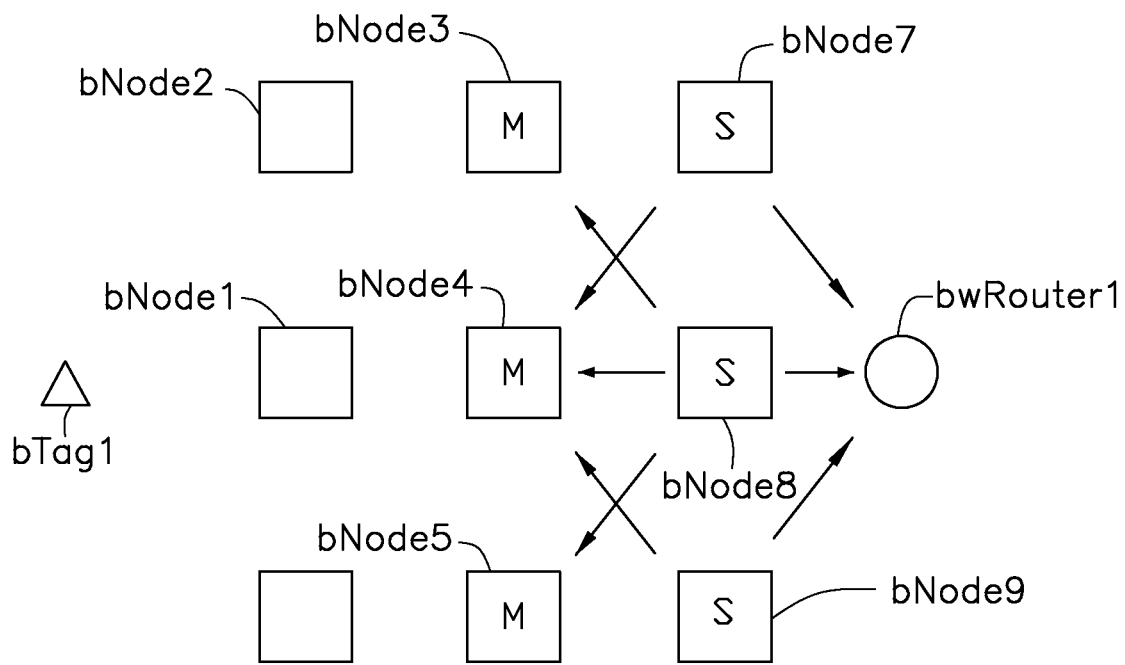

As shown in FIG. 2C, because the actual distances between the communication nodes bNode7-bNode9 and the switch node bwRouter1 are respectively shorter than the actual distances between the communication nodes bNode3-bNode5 and the switch node bwRouter1, the communication nodes bNode7-bNode9 respectively switch to the slave mode and broadcast the data packet. Then, the data packets broadcasted by the communication nodes bNode7-bNode9 are all received by the switch node bwRouter1. Thus, the data transmission is very reliable and efficient.

In this embodiment, the communication node bNode determines the actual distance between the communication nodes bNode and the destination node mainly according to the latitudes, longitudes, and heights of the communication node bNode and the destination node (e.g., the switch node bwRouter1 of FIG. 2A). Take the embodiment of FIG. 2A for example, the communication node bNode4 calculates the actual distance between the communication node bNode1 and the switch node bwRouter1 and the actual distance between the communication node bNode4 and the switch node bwRouter1 according to the latitudes, longitudes, and altitude of the communication nodes bNode1 and bNode4 and the switch node bwRouter1 (the destination node).

As described above, while the latitude, longitude, and the altitude of the communication node bNode is set up, the communication node bNode records the latitudes, longitudes, and altitudes of the neighboring communication nodes bNode and the switch nodes bwRouter and wGateway. However, it should be noticed that the latitudes, longitudes and altitudes of the neighboring nodes may be recorded after the communication node performs hopping mechanism. Moreover, after receiving the data packet from the other communication nodes bNode operating in the slave mode, the communication node bNode operating in the master mode may recognizes from the data packet the latitudes, longitudes, altitudes, media access control addresses (MAC addresses), and received signal-strength indicator (RSSI) values of the latter. Take FIG. 2A as an example, after receiving the data packet from the communication node bNode1, the communication node bNode4 may recognize the latitude, longitude, altitude, media access control address (MAC address), and received signal-strength indicator (RSSI) value of the communication node bNode1.

TABLE 1

| Form of Data Packet | | | | | |
| --- | --- | --- | --- | --- | --- |
| Raw Data | | | | Communication Node Data | |
| Source ID (6 bytes) | Delivery Time (4 bytes) | Delivery Location (6 bytes) | Data Content (5 bytes) | Broadcast Time (1 byte) | Communication Node Address (6 bytes) |
| MAC address | Hour H Minute M Second S Millisecond MS | Longitude X Latitude Y Altitude/Height Z | | Second S | Longitude X Latitude Y Altitude/Height Z |

Table 1 illustrates the form of the data packet according to an embodiment of the present disclosure. Generally, the data packet includes two parts, a raw data part and a communication node data part. The raw data part further includes source ID, delivery time, delivery location, and data content. The source ID may be the MAC address of the terminal device or the switch node that initially broadcasts the data packet. The delivery time is the transmission time of the data packet. The delivery location includes the latitude, longitude, and altitude of the terminal device or the switch node that initially broadcasts the data packet. The data content is the data that the data packet transmits. For example, the data content can be the data sensed by the terminal devices. The communication node data part further includes broadcast time and communication node address. The broadcast time represents the time that the data packet is broadcast by the communication node, and the communication node address refers to the latitude, longitude, and altitude of the communication node that broadcasts the data packet. In this embodiment, the data in the data packet may be in a form of binary, hexadecimal, or binary-coded decimal (BCD). It should be noted that the form of the data packet is not limited to the above and may be varied according to the implementation of the location-based network system.

In an embodiment of the present disclosure, the communication node bNode may include a routing table and a loop detection table. The routing table is used to record the latitudes, longitudes, and altitudes of the neighboring switch nodes bwRouter and wGateway. The loop detection table is used to record a recognition code of the received data packet and the latitude, longitude, and altitude of the communication node that broadcasts the received data packet. Take FIG. 2A as an example, the communication node bNode4 is able to correctly determine whether it should switch to the slave mode to broadcast the data packet based on the assistance from the routing table and the loop detection table. It should be noted that the communication node bNode may utilize the loop detection table to assisting in checking whether data packet has already been broadcasted. Take FIG. 2C as an example, when the communication node bNode4 switches back to the master mode and receives the data packet from the communication nodes bNode7-bNode9 operating in the slave mode, the communication node bNode4 may choose to stop broadcasting the data packet since the loop detection table has already recorded the recognition code of the data packet.

The recognition code of the data packet may include (1) the MAC address of the terminal device or the switch node that initially broadcasts the data packet, (2) the latitude, longitude, and altitude of the terminal device or the switch node that initially broadcasts the data packet, (3) the latitude, longitude, altitude of the communication node closest to the terminal device that transmits the data packet, and/or (4) an initially delivery time of the data packet. In this embodiment, the recognition code in the data packet of Table 1 is included in the source ID or the delivery location under the raw data part.

It should be noted that the communication node bNode may not necessarily include the routing table and the loop detection table. In other embodiments of the present disclosure, the communication node bNode may include only the routing table, or include neither of the routing table and the loop detection table. In the case that the communication node bNode does not include the routing table and the loop detection table, the form of the data packet is amended such that, when receiving the data packet, the communication node bNode checks the received data packet to assist in determining whether it should switch to the slave mode to broadcast the data packet.

With reference to FIG. 1 and FIG. 2A to FIG. 2C again, the location-based network system 100 may be able to further checks whether the data packet is successfully transmitted between the communication nodes bNode. Take FIG. 2A to FIG. 2B for example, after the communication node bNode1 broadcasts the data packet, the communication node bNode1 switches from the slave mode back to the master mode and monitors the other communication nodes. And, the communication node bNode1 operating in the master mode also monitors the data packet broadcast by the communication node bNode4 operating in the slave mode. Then, the communication node bNode1 receives the same data packet again. Because the data packet includes the recognition code, the communication node bNode1 easily recognizes that the data packet has been broadcasted and thus determines that the data packet is successfully received by the communication node bNode4.

Figure 2D:
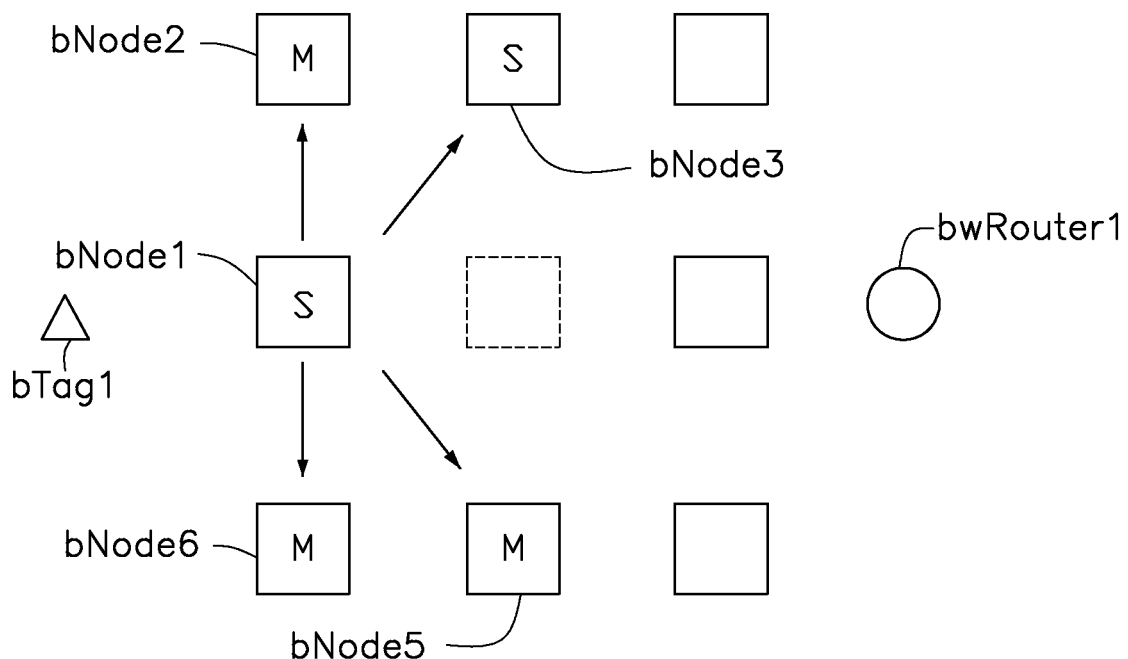

The location-based network system 100 is able to further avoid a damaged communication node and keep performing data transmission properly. As shown in FIG. 2D, if the communication node bNode4 is damaged and unable to receive data, the communication nodes bNode3 and bNode5 may assist in broadcasting the data packet. Namely, the location-based network system 100 has higher reliability.

Figure 2E:
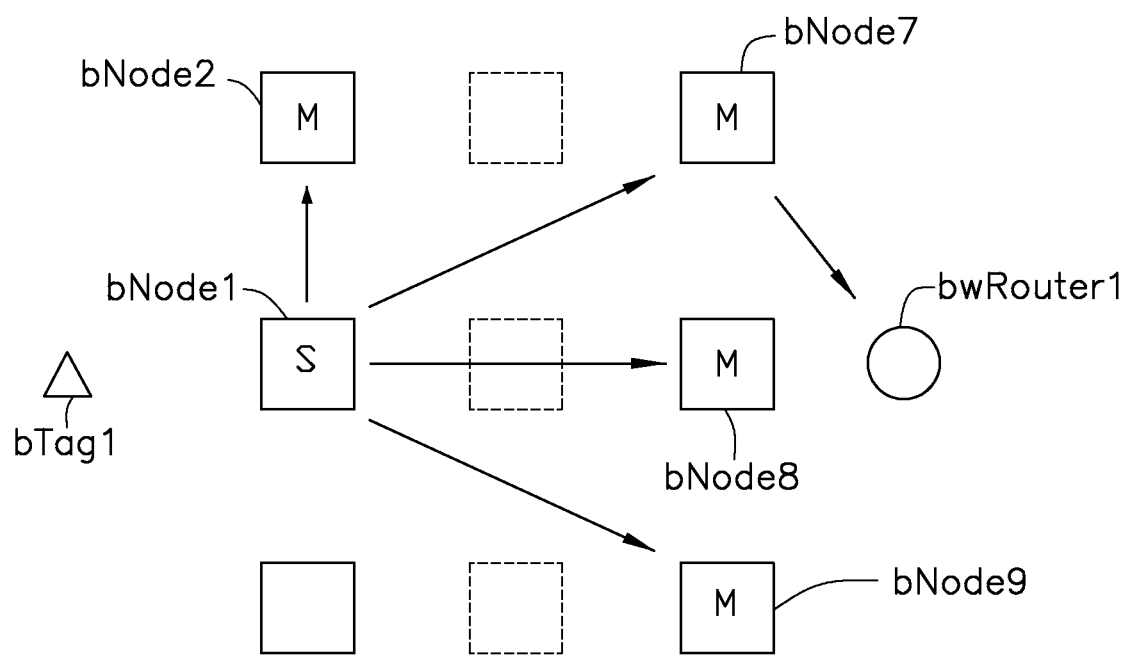

With reference to FIG. 1 and FIG. 2E, FIG. 2E further illustrates an operation of another location-based network system 100. As shown in FIG. 2E, if the communication nodes bNode3-bNode5 are all damaged, the data packet broadcasted by the communication node bNode1 operating in the slave mode cannot be transmitted back from the communication nodes bNode3-bNode5 to the communication node bNode1 operating in the master mode. If the communication node bNode1 still does not receive the data packet after a waiting period, the communication node bNode1 switches to the slave mode and broadcasts the data packet again. Furthermore, if the communication node bNode1 still does not receive the data packet again after a confirmation period longer than the waiting period, the communication node bNode1 determines that the communication nodes bNode3-bNode5 are damaged, thus increasing the transmission power and switching to the slave mode to broadcast the data packet again. Thus, the communication nodes bNode7-bNode9 operating in the master mode can receive the data packet broadcasted by the communication node bNode1. In addition, in another embodiment, after the communication node bNode1 increases the transmission power, the broadcast data packet may be received by the destination node (bwRouter1) directly. In yet another embodiment, if the communication node bNode1 further includes a light emitting diode or other light sources therein, the communication node bNode1 may activate a corresponding warning light to notify the user of the location-based network system 100 to repair the damaged communication nodes bNode3-bNode5.

FIG. 2A to FIG. 2E illustrate the embodiment of the location-based network system 100 where the terminal device bTag1 transmits the data packet to the switch node bwRouter1. However, it should be noted that the present disclosure is not limited to the above. An electronic device connected to the cloud network platform 40 may also transmit the data packet to the terminal device bTag via the location-based network system 100 based on the transmission method depicted in FIG. 2A to FIG. 2E. It should be noted that the cloud network platform 40 may record the latitudes, longitudes, and altitudes of all the switch nodes bwRouter and wGateway, the communication nodes bNode, and the terminal device bTag in the initial set up of the location-based network system 100, so that the data packet can be correctly transmitted to the destination node. However, the cloud network platform 40 may also record the latitudes, longitudes, and altitudes of the switch nodes bwRouter and wGateway, the communication nodes bNode, and the terminal device bTag by receiving the data packet transmitted from the location-based network system 100. In another embodiment, the cloud network platform 40 does not accurately record the latitude, longitude, and altitude of the terminal device bTag but records the latitude, longitude, and altitude of the communication node bNode closest to the terminal device bTag, so as to position the terminal device bTag. In yet another embodiment, the terminal device bTag obtains the latitudes, longitudes, and altitudes of several communication nodes bNode closest to the terminal device bTag and accordingly calculates the location of the terminal device bTag based on triangulation technology and then uploads a calculation result thereof to the cloud network platform 40.

It should be noted that the data transmission method described in the above embodiment is also applicable to a network architecture composed of the communication node wNode, the terminal device wTag, the switch nodes bwRouter or wRouter and wGateway, and the cloud network platform 40. In other words, the latitudes, longitudes, and altitudes of the communication node wNode, the terminal device wTag, and the switch nodes bwRouter and wGateway are also used for determining and deciding the transmission path of the data packet.

In addition, after the transmission path is determined by using the above method, the communication node or the terminal device which is a source node, and the switch node which is the destination node of the data packet can further store all the transmission path of the data packet and assign the priority of each transmission path according to a sequence the data packet arrived at the destination node. In other words, if the data packet transmitted by a first transmission path arrives first, the first transmission path will be assigned a highest priority. If the data packet transmitted by a third transmission path arrives second, the third transmission path will be assigned a second highest priority. During the transmission of a data packet between the source node and the destination node, the transmission path having the highest priority will be selected to transmit the data packet. If the transmission path having the highest priority is congested, the transmission path having the second highest priority will be selected. Thus, data packets can be transmitted quickly and accurately.

FIG. 3A to FIG. 3G are schematic diagrams illustrating an operation of a location-based network system according to an exemplary embodiment of the present disclosure. In the exemplary embodiment shown as FIG. 3A to FIG. 3G, the location-based network system 100 includes a number of communication nodes bNode11-bNode 17 and a switch node bwRouter2. The communication nodes bNode11-bNode17 may be street lamps arranged along at least one side of a street or a bridge shown in FIG. 6, for example. The switch node bwRouter2 may be arranged at one end of the street or the bridge, and the street lamps and the switch node can form a system of Internet of Things (IoT). In an alternative embodiment, the location-based system 100 may further include two switch nodes bwRouter2 (not shown), the two switch nodes bwRouter2 can be arranged at two ends of the street or the bridge. In other embodiments, the switch node bwRouter2 may be arranged in the middle of the street or the bridge. Each of the communication nodes bNode11-bNode17 may include a processor and a Bluetooth module for communicating with the other communication nodes and the switch node bwRouter2. The communication nodes (e.g., street lamps) can be operated in one of a master mode and a slave mode.

Figure 3A:
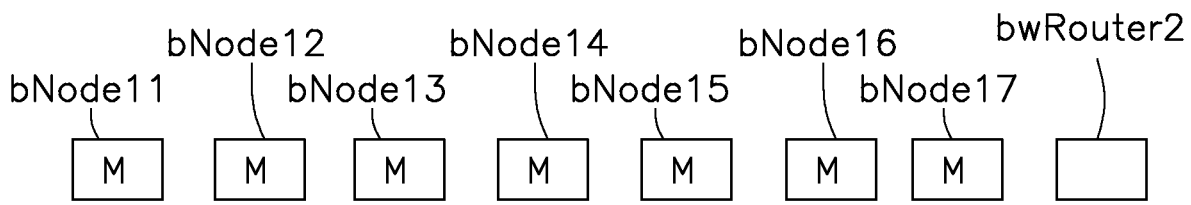
FIG. 3A to FIG. 3G are schematic diagrams illustrating an operation of a location based system according to an example of the present disclosure.
Figure 3B:
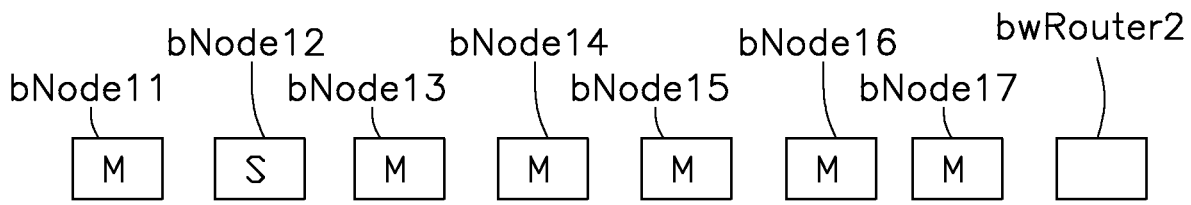
Figure 3C:
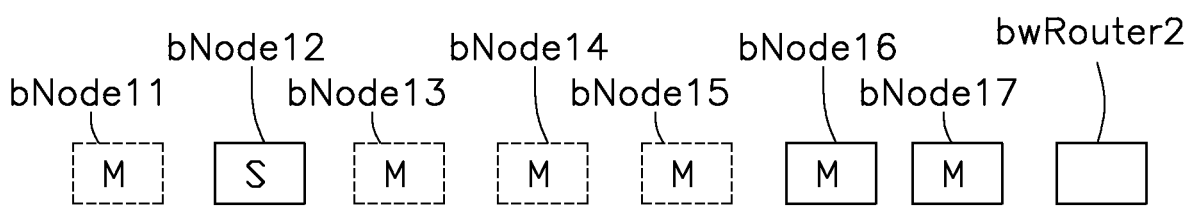

In this exemplary embodiment, in an initial state, each of the communication nodes is in the master mode, as shown in FIG. 3A. The processor in each of communication nodes may acquire environment parameters from at least one sensor which may be mounted on the street lamp. In this embodiment, the sensor is configured to monitor the environment parameters, for example the humidity of the air, pollutant levels, the environmental noise, the environment luminance, a traffic flow. Accordingly, the sensor can be a hygrometer for monitoring the humidity of the air, an air quality monitor for monitoring pollutant levels, a noisemeter or a microphone for monitoring the environmental noise, a luminance meter for monitoring the environment luminance, a traffic detector for monitoring a traffic flow, and other sensors that monitors the environment. The processor further compares the acquired environment parameters with historical environment parameters to determine whether the environment is abnormal. If the processor of the communication node bNode12 determines that the environment is abnormal, the processor of the communication node bNode12 generates a data packet including the acquired environment parameters and indicating the abnormal condition. The processor of the communication node bNode12 also switches the communication node bNode12 to the slave mode, as shown in FIG. 3B, and broadcasts the data packet, as shown in FIG. 3C. If the communication nodes bNode11 and bNode13-bNode15 receive the data packet, the communication node bNode11 and bNode13-bNode15 respectively recognize a destination node of the data packet. In this embodiment, the destination node of the data packet is the switch node bwRouter2. Meanwhile, each of the communication nodes bNode11 and bNode13-bNode15 determines whether it should switch to the slave mode according to the actual distances between it and the switch node bwRouter2 and an actual distance between the communication node bNode12 and the switch node bwRouter2.

Figure 3D:
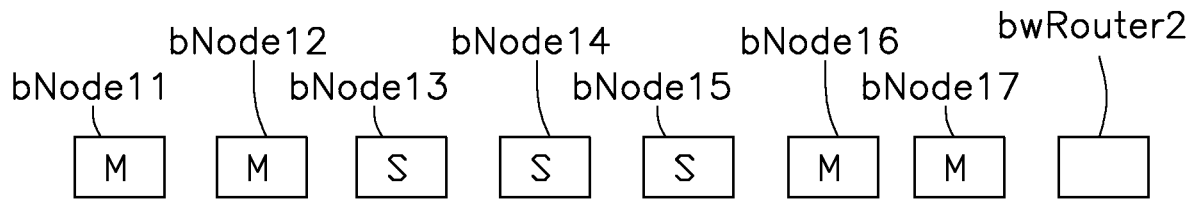
Figure 3E:
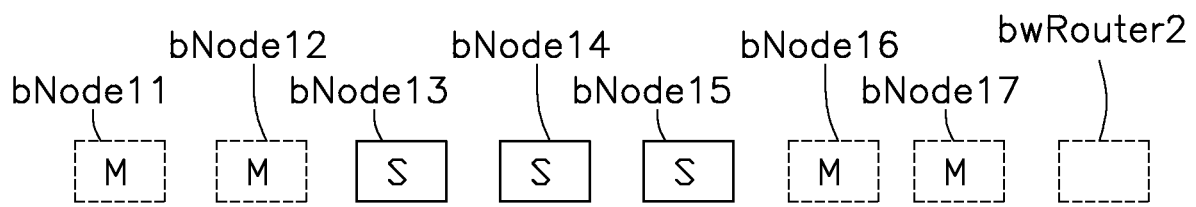
Figure 3F:
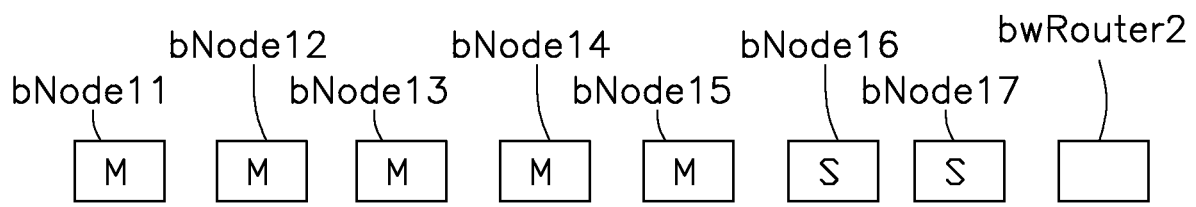
Figure 3G:
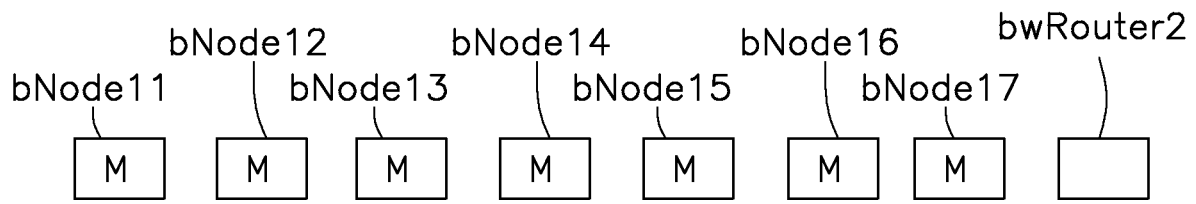

In this embodiment, the actual distance between the communication node bNode13 and the switch node bwRouter2, the actual distance between the communication node bNode14 and the switch node bwRouter2, and the actual distance between the communication node bNode15 and the switch node bwRouter2 are shorter than the actual distance between the communication node bNode12 and the switch node bwRouter2. On the other hand, the actual distance between the communication node bNode11 and the switch node bwRouter2 is longer than the actual distance between the communication node bNode12 and the switch node bwRouter2. Thus, as shown in FIG. 3D, the communication nodes bNode13-bNode15 switch to the slave mode, and the communication node bNode12 stays or switches to the master mode. As shown in FIG. 3E, when operating in the slave mode, the communication nodes bNode13-bNode15 respectively broadcast the data packet. Then, the communication nodes bNode11-bNode12, bNode16-bNode17, and the switch node bwRouter2 may receive the data packet. Likewise, after receiving the data packet, each of the communication nodes bNode11-bNode12 and bNode16-bNode17 further recognizes the destination node (i.e., the switch node bwRouter2) of the data packet, and determine whether it should switch to the slave mode and broadcast the data packet according to the actual distances between it and the switch node bwRouter2 and the actual distances between the communication nodes bNode13-bNode15 and the switch node bwRouter2. Then, as shown in FIG. 3F, the communication nodes bNode13-bNode15 switch to the master mod, and the communication nodes bNode16-bNode17 switch to the slave mode and broadcast the data packet to the bwRouter2. Afterwards, as shown in FIG. 3G, the communication nodes bNode16-bNode17 switch to the master mode. In this exemplary embodiment, although the switch node bwRouter2 has received the data packet from the bNode15, the communication nodes bNode16-bNode17 also broadcast the data packet to the switch node bwRouter2 to increase the reliability of the data transmission, and avoid transmission failure.

Thus, the switch node bwRouter2 may receive the abnormal environment parameters rapidly and reliably. Furthermore, the switch node bwRouter2 may further transmit the abnormal environment parameters to the cloud network platform 40, and thus related personnel may monitor the environment continuously and/or in real time, and a smart city may be constructed. It should be noted that the operation described in the above embodiment is not limited thereto. The communication nodes bNode11-bNode17 may further monitor the terminal devices bTag nearby and receive information from terminal devices bTag (e.g., mobile phone, smart band, unmanned aerial vehicle, and unmanned ground vehicle) which is close to the communication nodes bNode11-bNode17. The acquired information may be a request input by a user for searching a location of a store, a company, a scenic spot, a taxi, and the like. The acquired information may further be incorporated into location information, business information, multimedia information and other information shared by the user having the terminal device bTag or wTag. Thus, the user is able to use the location-based network system 100 to acquire and share information instead of using the Internet.

In the alternative embodiment, a source communication node (i.e. the communication node bNode12) that originally broadcasts the data packet firstly determines which switch node bwRouter2 is closer according to the latitude, longitude, and altitude of the two switch nodes bwRouter2 and the latitude, longitude, and altitude of the communication node bNode12, and determines the closer switch node bwRouter2 of the two switch nodes bwRouter2 will be the destination node. Then, the source communication node bNode12 transmits the data packet to the destination node (the closer switch node bwRouter2) by using the method as described above. By using the two switch nodes bwRouter2, the transmission speed can be increased. On the other hand, if one of the two switch node bwRouter2 is broken, the communication nodes bNode11-15 still can transmit the data packet to the other switch node bwRouter2. Furthermore, if one of the communication node (i.e. the communication node bNode15) determines that the destination node (the closer switch node bwRouter2) is broken, the communication node bNode15 can further generate an alert message and transmit the alert message to the other switch node bwRouter2 or the cloud network platform 40 via the communication nodes in the location-based network system 100, informing the broken switch node bwRouter2. In this embodiment, if the communication node bNode15 determines that the switch node bwRouter2 cannot receive the data packet for a predetermined number of times, such as 3 times, the communication node bNode15 determines that the switch node bwRouter2 is broken. In this embodiment, the alert message at least includes the longitude, the latitude, and the altitude of the broken switch node bwRouter2.

FIG. 4A to FIG. 4H are schematic diagrams illustrating an operation of a location-based network system according to another embodiment of the present disclosure. In this embodiment, the location-based network 100 includes a switch node bwRouter3 and a number of communication nodes bNode21-bNode26, bNode31-bNode36, bNode41-bNode46, and bNode51-56 arranged two-dimensionally. In this exemplary embodiment, the communication nodes may be street lamps arranged along multiple streets. For example, the communication nodes bNode21-bNode26 may be arranged along a first street, the communication nodes bNode31-bNode36 may be arranged along a second street, the communication nodes bNode41-bNode46 may be arranged along a third street, and the communication nodes bNode51-bNode 56 may be arranged along a fourth street. Each of the street lamp can monitor the environment parameters to detect abnormal conditions of the environment. Each of the communication nodes can operate in one of a master mode and a slave mode.

Figure 4A:
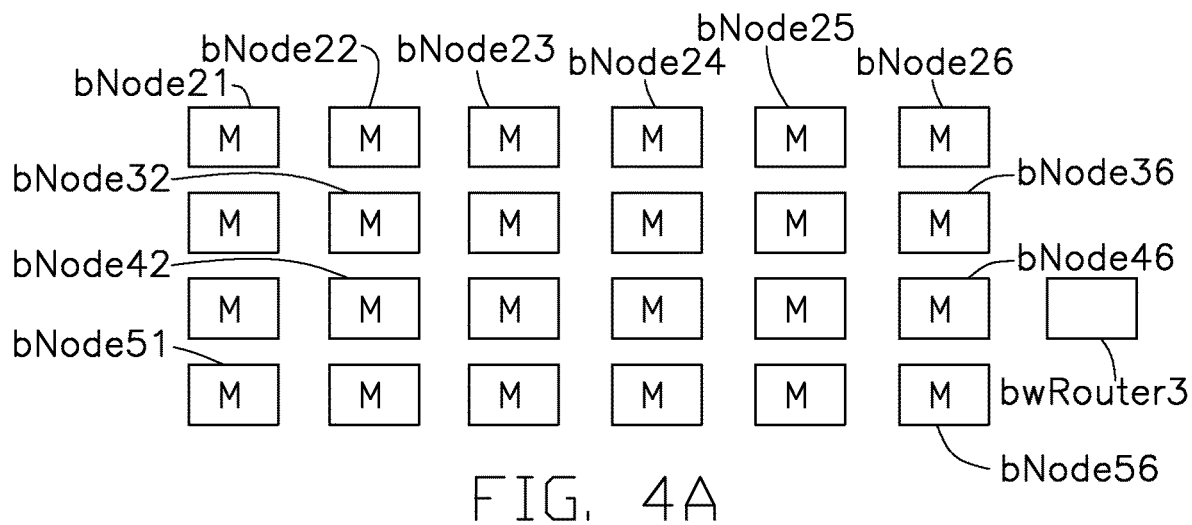
FIG. 4A to FIG. 4H are schematic diagrams illustrating an operation of a location based system according to another example of the present disclosure.
Figure 4B:
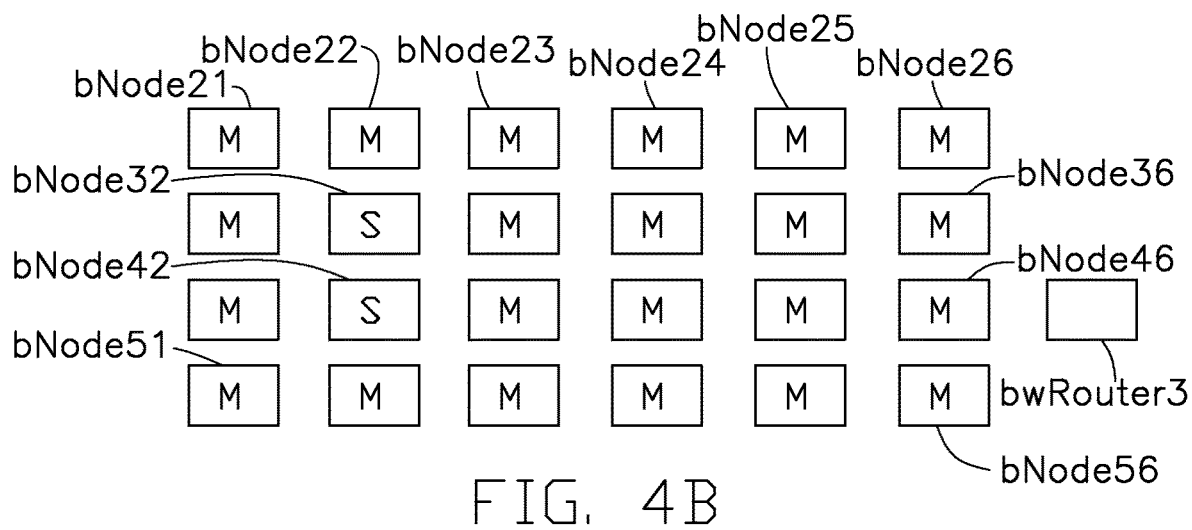
Figure 4C:
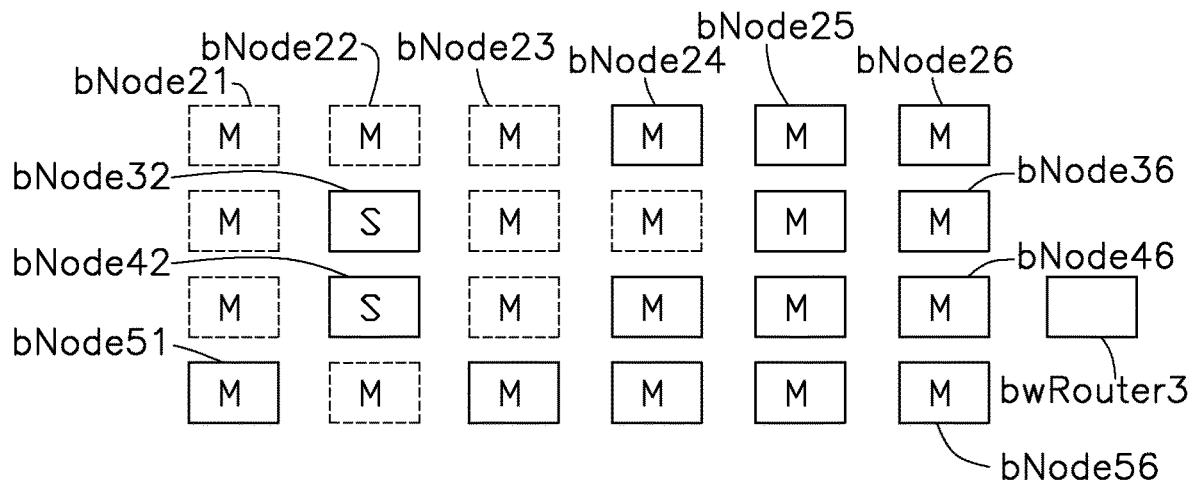

In this exemplary embodiment, in an initial state, each of the communication nodes is in the master mode, as shown in FIG. 4A. If both of the communication node bNode32 and the communication node bNode42 detect an abnormal condition in the environment, the communication nodes bNode32 and bNode42 respectively generate a data packet indicating the abnormal condition. Then, as shown in FIG. 4B, each of the communication nodes bNode32 and bNode42 switches to the slave mode and broadcasts the data packet. Then, as shown in FIG. 4C, the communication nodes bNode21-bNode23, bNode31, and bNode33-34 may receive the data packet from the communication node bNode32. The communication nodes bNode41, bNode43 and bNode52 may receive the data packet from the communication node bNode42.

In this embodiment, if a communication node, such as the communication node bNode43, detects two or more data packets from different communication nodes at the same time, the communication node can compare the actual distances to each of the communication nodes broadcast the data packets and receive the data packet broadcasted by the nearest communication node. However, it should be noticed that the communication node may receive all detected data packets at the same time.

Figure 4D:
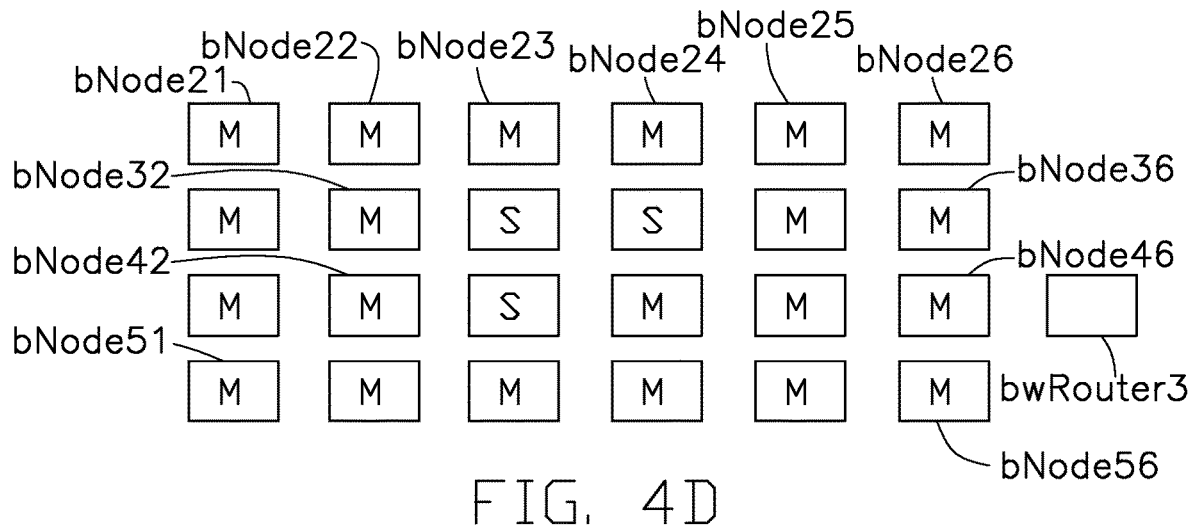
Figure 4E:
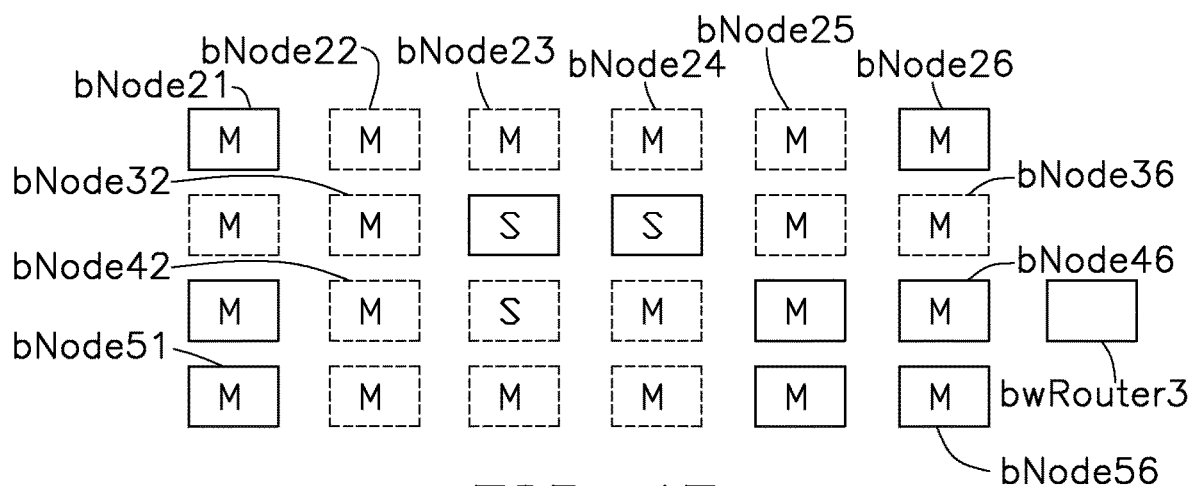
Figure 4F:
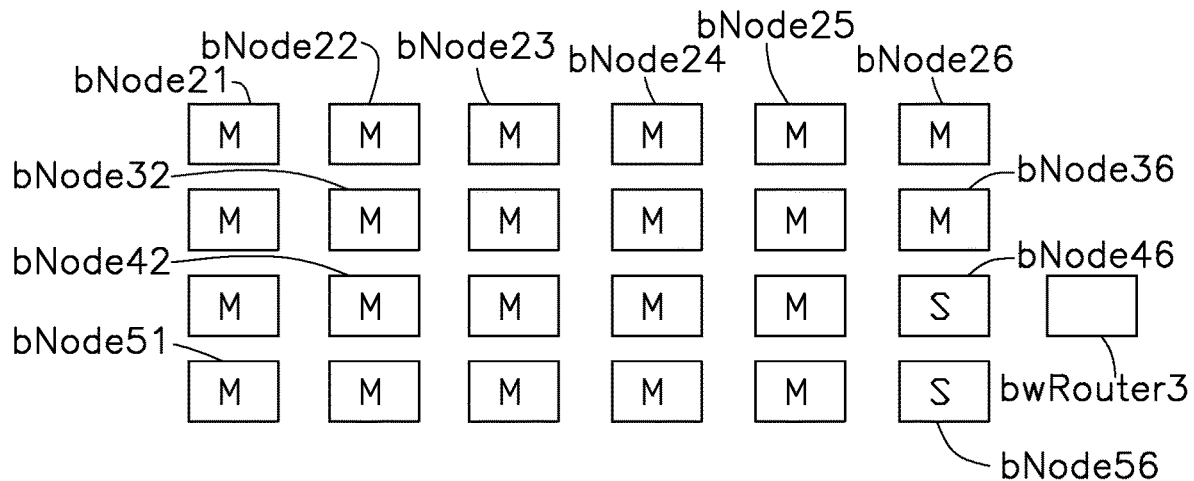
Figure 4G:
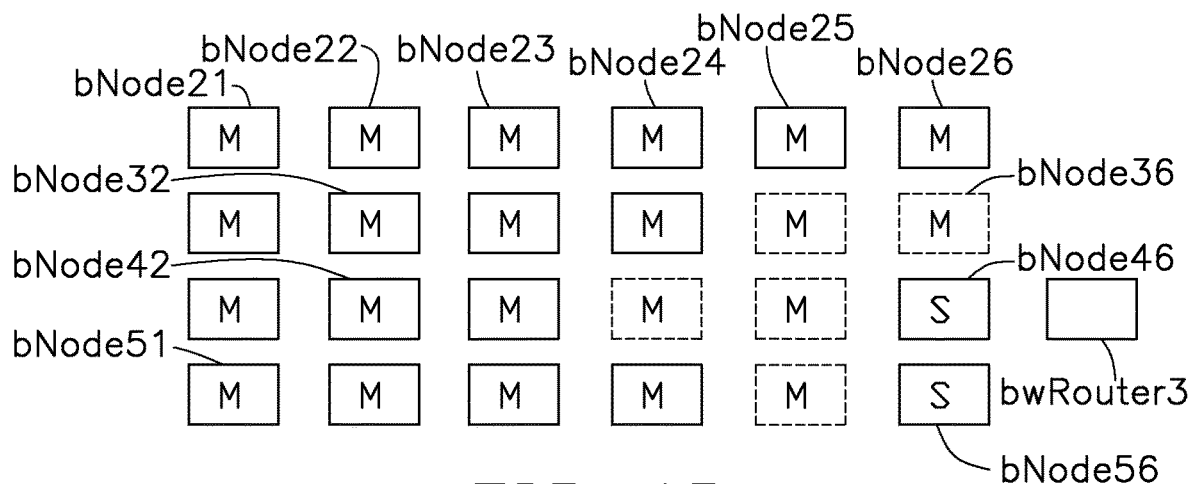
Figure 4H:
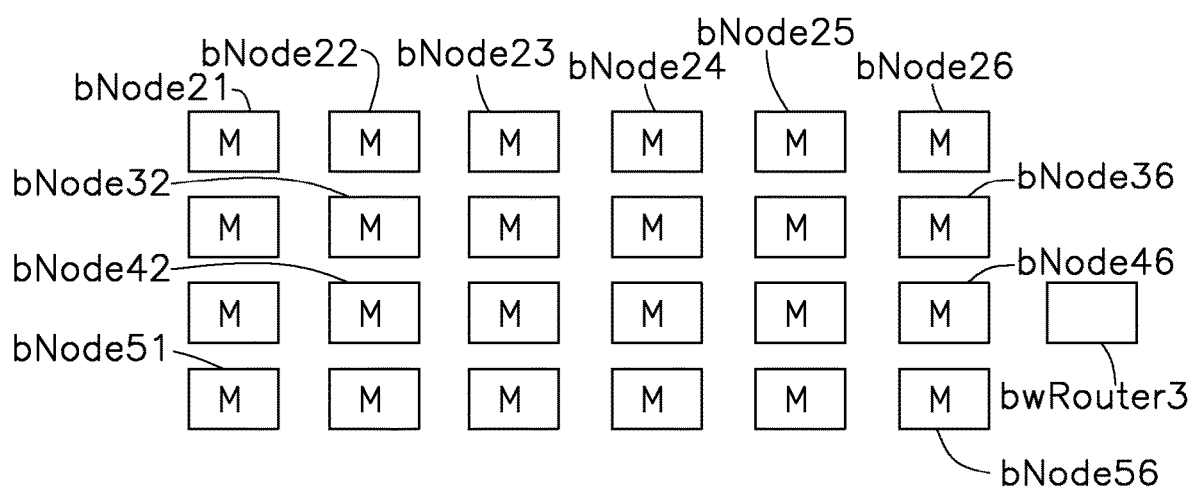

After receiving the data packet, each of the communication nodes bNode21-bNode23, bNode31, and bNode33-bNode34 recognizes the destination node of the data packet (i.e., the switch node bwRouter3) and determines whether it should switch to the slave mode according to the actual distances between it and the switch node bwRouter3 and an actual distance between the communication node bNode32 and the switch node bwRouter3. In this embodiment, the distance between the communication node bNode33 and the switch node bwRouter3 and the distance between the communication node bNode34 and the switch node bwRouter3 are shorter than the distance between the communication node bNode32 and the switch node bwRouter3. Thus, the communication nodes bNode33 and bNode34 switches to the slave mode and broadcast the data packet received from the communication node bNode32, as shown in FIG. 4D, and the communication node bNode32 switches to the master mode. Also, after receiving the data packet from the communication node bNode42, each of the communication node bNode41, bNode43 and bNode52 recognizes the destination node of the data packet (i.e., the switch node bwRouter3) and determine whether it should switch to the slave node according to the actual distance between it and the switch node bwRouter3 and an actual distance between the communication node bNode42 and the switch node bwRouter3. For example, the actual distance between the communication node bNode43 and the switch node bwRouter3 is shorter than the actual distance between the communication node bNode42 and the switch node bwRouter3, and thus the communication node bNode43 switches to the slave mode and broadcasts the data packet received from the communication node bNode42, as shown in FIG. 4D, and the communication node bNode42 switches to the master mode.

By such analogy, as shown in FIG. 4E to FIG. 4H, the data packets will be transmitted to the switch node bwRouter3 via the communication nodes. Thus, the bwRouter3 can detect all the abnormal conditions of the environment via the location based network system 100.

It should be noticed that the communication nodes may be arranged three-dimensionally (e.g., different floors of a building). The data packets can be transmitted to the switch node bwRouter via the communication nodes bNode and/or wNode arranged in a three-dimensional space by using the above method. In at least one embodiment, a routing map may be formed according to a Google™ map or a 3D model of the environment.

It should be noticed that, during the data transmission, a specifically set data transmission path is not required among the communication nodes in the location-based network system, and the data packet can be accurately transmitted to the correct destination node by the aforementioned hopping. In addition, by utilizing the broadcast mechanism, the data packet is able to be simultaneously received by multiple communication nodes and each of the communication nodes is able to assessing whether it should forward the received data packet. Thus, the reliability of data transmission is improved. Furthermore, the communication nodes, the terminal devices and the switch nodes can form an intranet, decreasing the risk generated from the Internet.

Also, it should be noted that the location-based network system including the communication nodes may perform data transmission according to a set connection path and is not restricted to hopping by broadcasting. Thus, the location-based network system is more flexible and convenient to use. The location-based system shown in FIG. 5A to FIG. 5G can be taken as an example to illustrate the location-based network system that perform data transmission according to the set connection path.

With reference to FIG. 5A to FIG. 5G, the location-based network system 100 includes a number of communication nodes bNode61-bNode67 and at least one switch node bwRouter4. The communication nodes bNode61-bNode67 may be street lamps arranged along at least one side of a street or a bridge, as shown in FIG. 6, and the switch node bwRouter4 can be arranged at one of two ends of the street or the bridge. In an alternative embodiment, the location-based system 100 may include two switch nodes bwRouter4 arranged at two ends of the street or the bridge. The street lamps and the switch node may form a system of Internet of Things (IoT). Each of the communication nodes bNode61-bNode67 may include a processor and a Bluetooth module for communicating with the other communication nodes and the switch node bwRouter4. Each of the communication nodes bNode61-bNode67 may operate in one of a master mode and a slave mode.

Figure 5A:
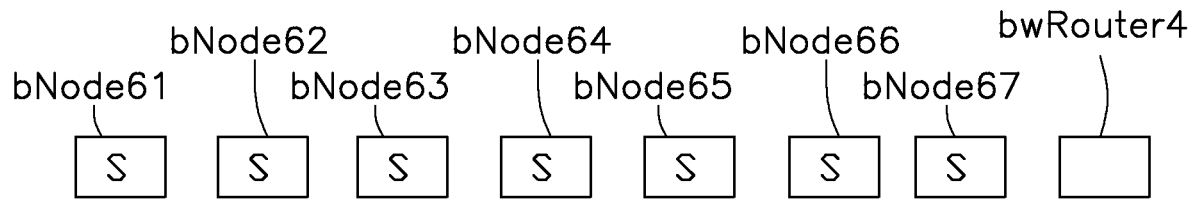
FIG. 5A to FIG. 5G are schematic diagrams illustrating an operation of a location-based network system according to an exemplary embodiment of the present disclosure.
Figure 5B:
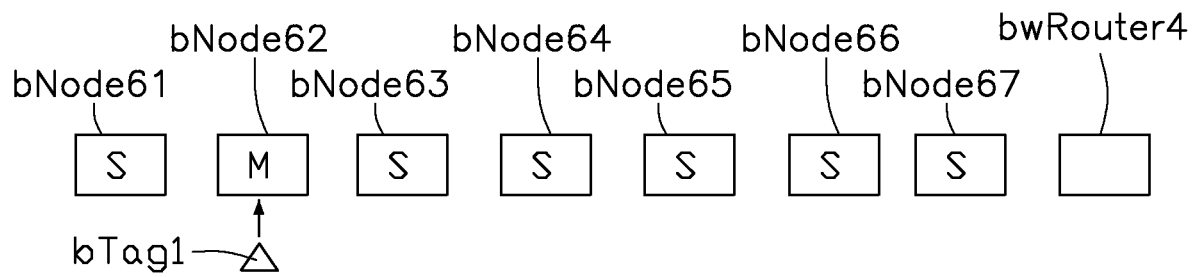
Figure 6:
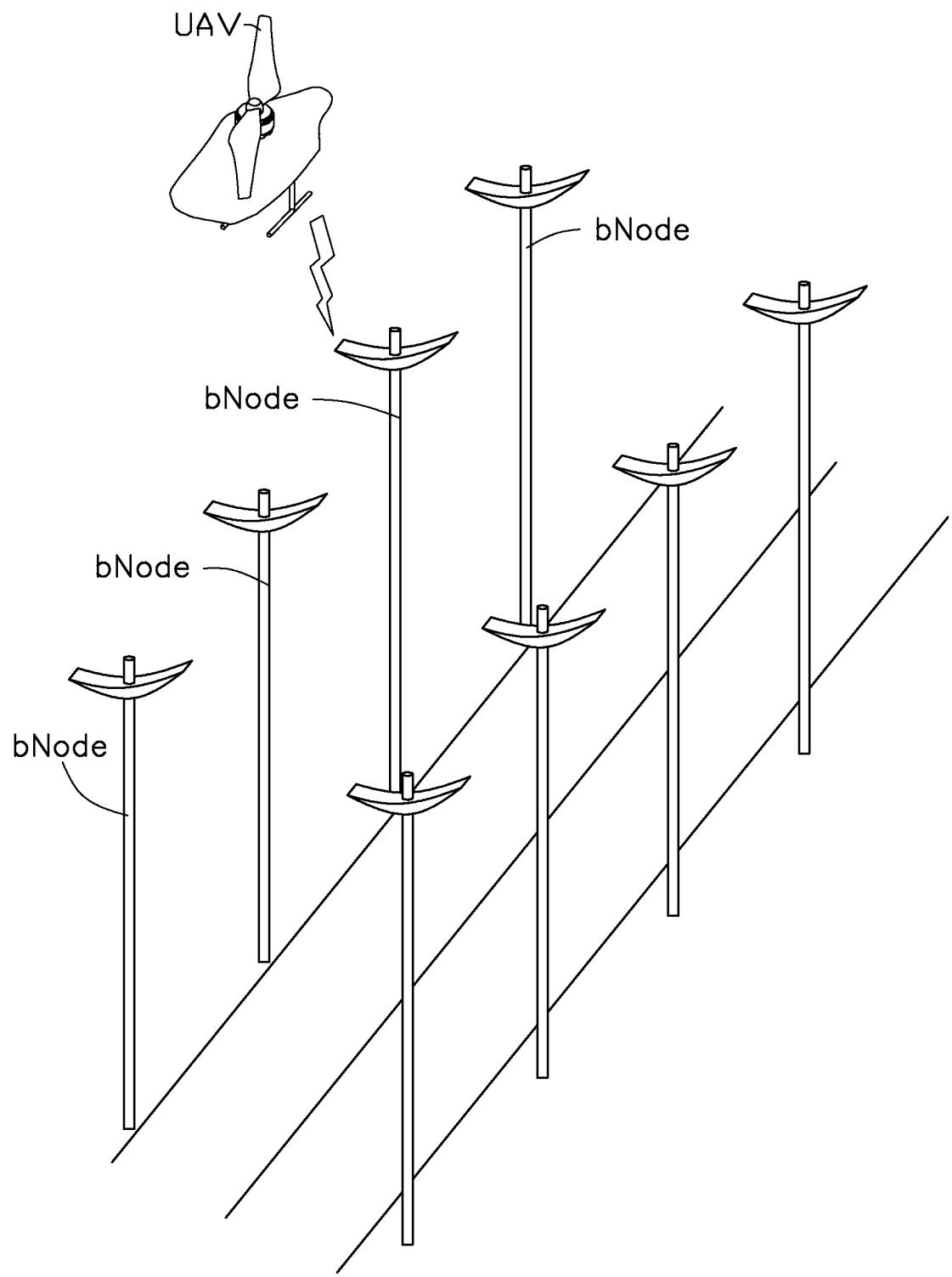
FIG. 6 is a schematic diagram illustrating an example related to unmanned aerial vehicles in the location-based network system of FIG. 1-5G.

In this embodiment, in an initial state, each of the communication node bNode61-bNode67 is in the slave mode, as shown in FIG. 5A. When an terminal device bTag1 (such as a mobile phone, a SmartBand, an unmanned ground vehicle, or an unmanned aerial vehicle) is close to one of the communication nodes (i.e., the communication node bNode62) and send an data packet, the communication node bNode62 switches to the master mode and receives the data packet, as shown in FIG. 5B. In this embodiment, the data packet sent by the terminal device bTag1 can include a request input by a user via an application installed in the terminal device bTag1, the request input for searching a location of a lavatory, a store, an office, a company, a scenic spot, and other locations that the users desired to know. The data packet sent by the terminal device bTag1 can further include a variety of information, such as location information of the terminal device bTag1 itself, business information, information a user shares in an application installed in the terminal device bTag1, or the like.

Figure 5C:
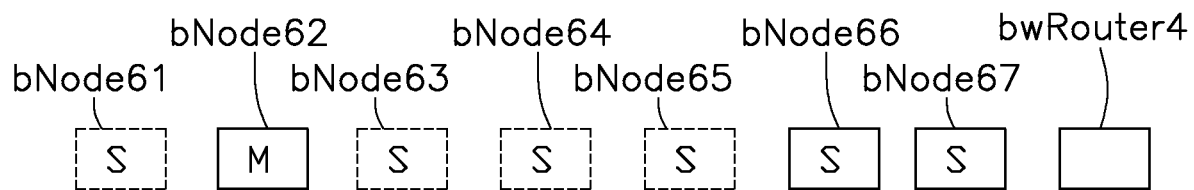
Figure 5D:
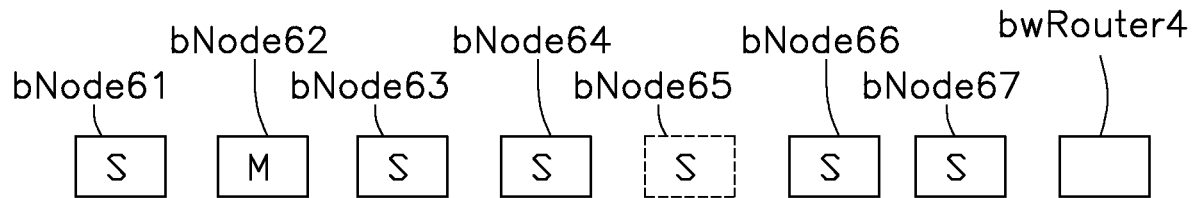

Then, as shown in FIG. 5C, the communication node bNode62 detects the neighboring communication nodes (i.e., the communication nodes bNode61, bNode 63, bNode64 and bNode65). Then the communication node bNode62 calculates the actual distance between the detected communication nodes (i.e., the communication nodes bNode61, bNode63, bNode64 and bNode65) and the switch node bwRouter4, according to the latitude, the longitude, and the altitude of the detected communication nodes and the latitude, the longitude, and the altitude of the switch node bwRouter4. The communication node bNode62 further selects a communication node which is nearest to the switch node bwRouter4 to connect to according to the calculated actual distance. As shown in FIG. 5D, for example, the actual distance between the communication node bNode65 and the switch node bwRouter3 is the shortest, so the communication node bNode62 connects to the communication node bNode65 and transmits the data packet to the communication node bNode65. Afterwards, the communication node bNode62 switches back to the slave mode.

Figure 5E:
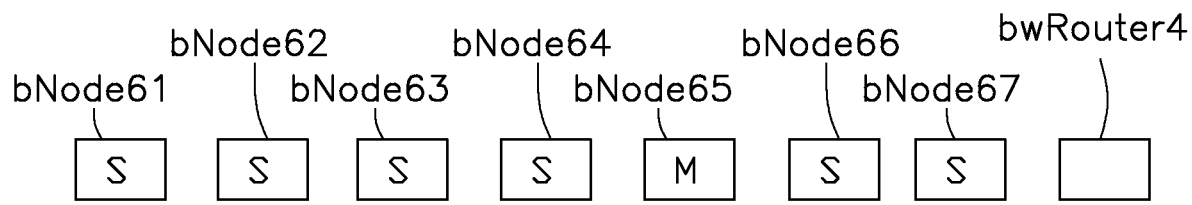
Figure 5F:
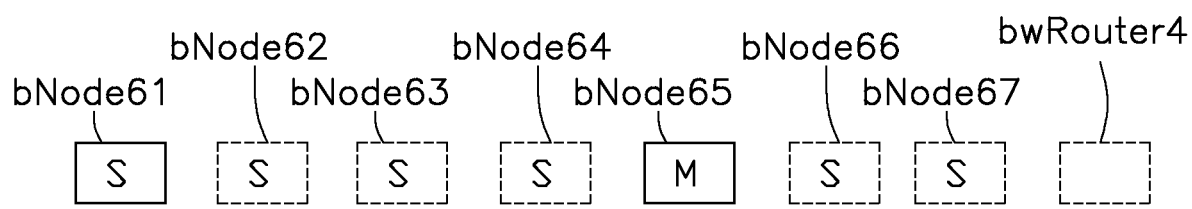
Figure 5G:
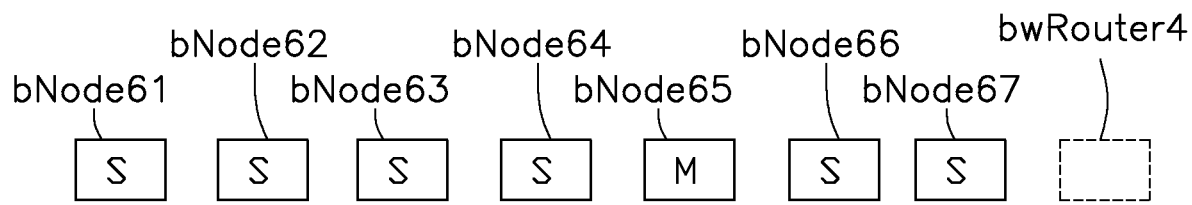

In FIG. 5E, the communication node bNode65 switches to the master mode after receiving the data packet from the communication node bNode62. Then, in FIG. 5F, the communication node bNode65 repeats the data transmission method shown in FIG. 5C to FIG. 5D, and the destination node (switch node bwRouter3) is detected by the communication node bNode65, and thus the communication node bNode65 directly connects to the switch node bwRouter4 and transmits the data packet to the switch node bwRouter4. Thus, the switch node bwRouter4 can obtain the information from the terminal device bTag1.

The switch node bwRouter4 can further transmit the data packet to the cloud network platform, and thus the cloud network platform can transmit the data packet to other users who requires the data packet, or reply to the terminal device bTag1 corresponding information in response to the data packet. For example, if the data packet sent by the terminal device bTag1 includes a request input by the user for searching a location of a scenic spot, the cloud network platform can send back a data packet including a map of the scenic spot to the terminal device bTag1; if the data packet sent by the terminal device bTag1 includes information the user shared in an application installed in the terminal device bTag1, the cloud network platform can share the information to other users via the location-based network systems connected to the cloud network platform, and thus other people can obtain the shared information.

FIG. 6 is a schematic diagram illustrating an example related to unmanned aerial vehicles in the location-based network system of FIG. 1-5G. The unmanned aerial vehicles (UAVs) can be used as part of the communication nodes, and each of UAVs can include a first wireless communication module, a second wireless communication module, and a processor. The UAV can operate in two modes as shown in FIG. 1-5G. Referring to FIG. 2, for example, the UAVs can be the communication nodes locating at places which are hard to reach, and have sensors activating the UAVs from the master mode to the slave mode to broadcast the data packet, extending the location-based network system, a mesh network. Referring to FIG. 5, for example, the UAVs can be the terminal devices bTag continuously monitoring environment and uploading data in a specific area automatically. The UAVs can have predetermined thresholds for abnormal signals to activate the UAVs so as to pair a close communication node and upload the data packet indicating the abnormal condition. Then, the connected communication node integrated with the streetlight, denoted as bNode in FIG. 6 is triggered from the slave mode to the master mode to transmit the data packet, making the mesh network more flexible. The data packet sent by the UAV can further include information of videos, audios, and pictures taken by the UAV. In addition, the terminal device bTag (UAV) can further include actuators. For example, the sensor can be a smoke detector or a fog detector and the actuator can be a fire alarm or a high luminance LED. It should be noticed that the UAVs can return to a stationary hub close to the owner for recharging or maintenance.

Figure 7A:
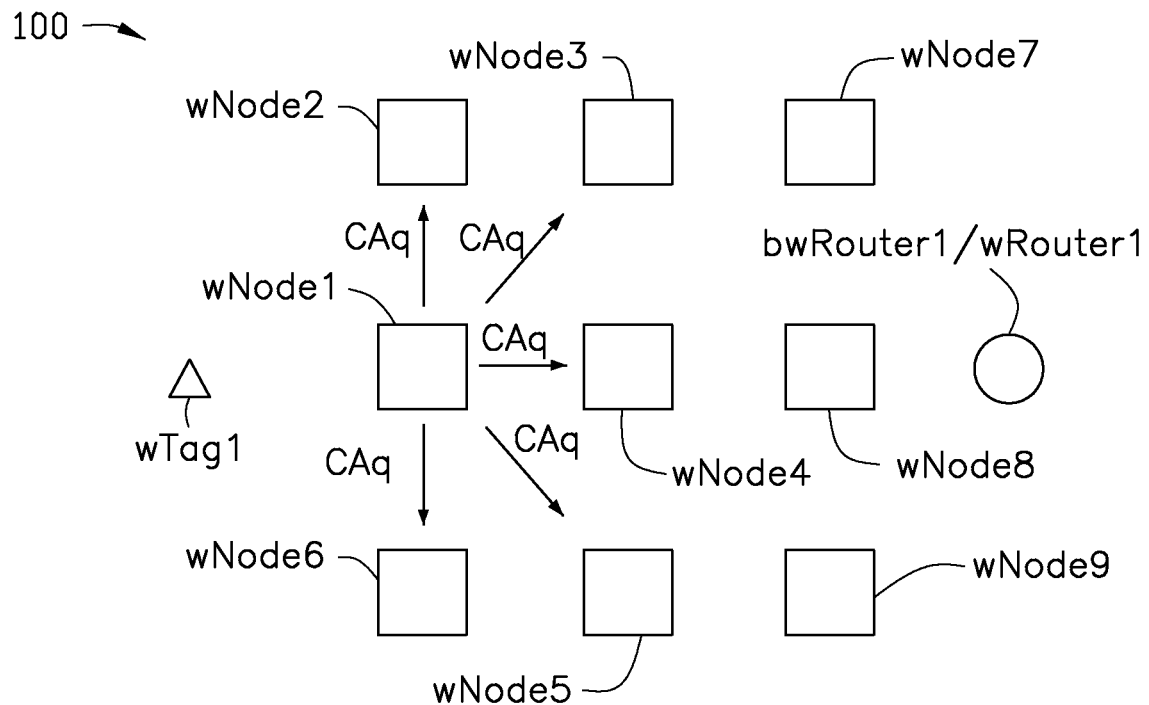
FIG. 7A to FIG. 7C are schematic diagrams illustrating an operation of a location-based network system according to a second embodiment of the present disclosure.
Figure 7B:
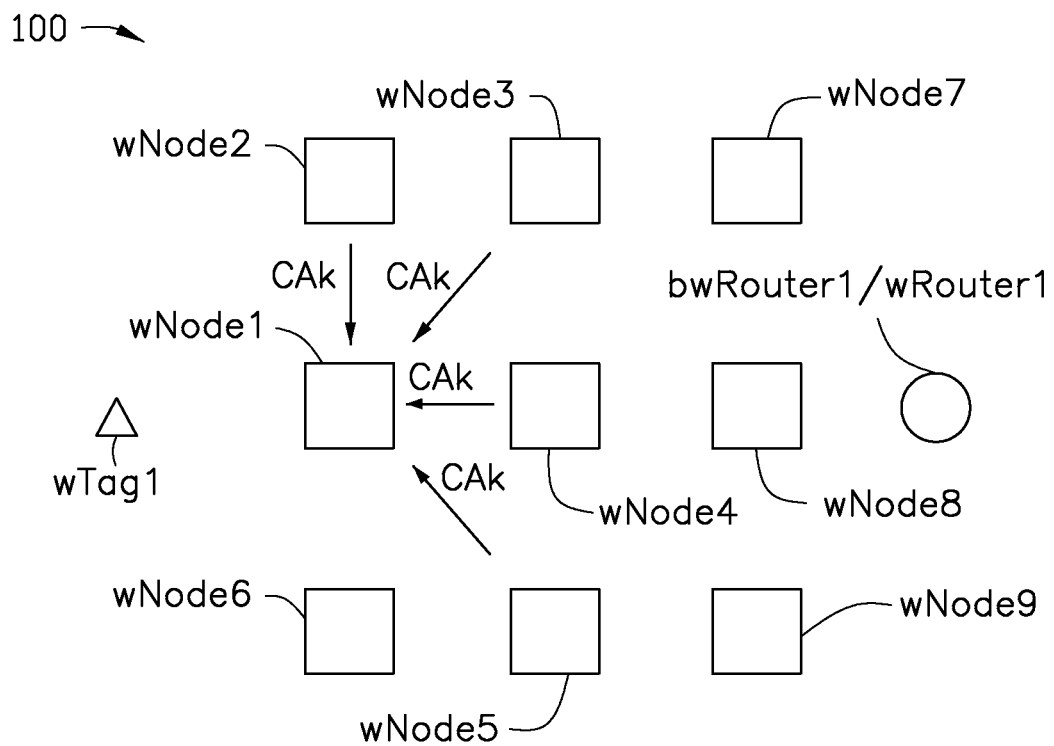
Figure 7C:
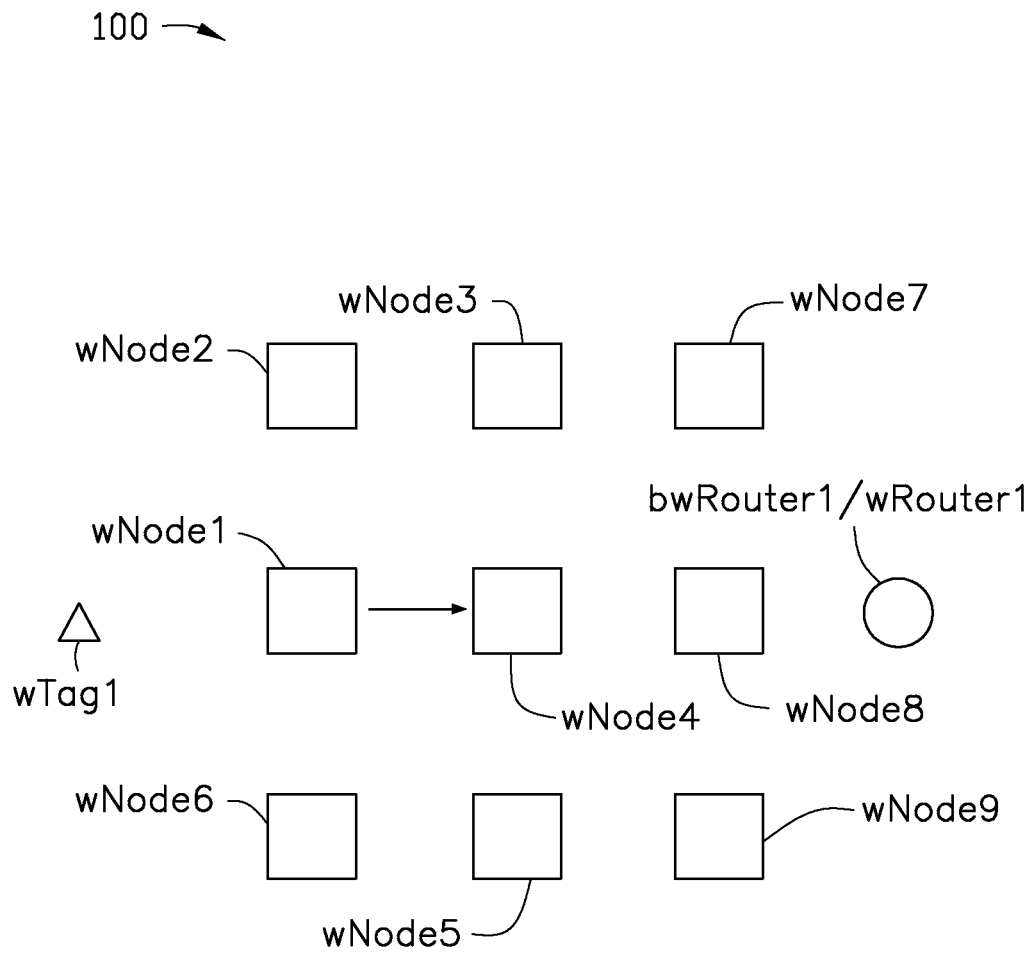

FIG. 7A to FIG. 7C are schematic diagrams illustrating an operation of a location-based network system according to a second embodiment of the present disclosure.

With reference to FIG. 7A to FIG. 7C, the location-based network system 100 transmits the data packet from the terminal device wTag1 to the switch node (e.g., bwRouter1 or wRouter1) via communication nodes wNode1-wNode9. Referring to FIG. 7A, after receiving the data packet from the terminal device wTag1, the communication node wNode1 transmits a connection acquire signal CAq to the neighboring communication nodes wNode2-wNode6. In this embodiment, the connection acquire signal CAq at least include the MAC address of the communication node wNode1, the latitude, longitude, and altitude of the communication node wNode1 which sends the connection acquire signal CAq.

Then, as shown in FIG. 7B, the available communication nodes (e.g., communication nodes wNode2-wNode5) respectively send back a connection acknowledgement signal CAk to the communication node wNode1. Each of the connection acknowledgement signals CAk includes the latitude, longitude, and altitude of each of the communication nodes (e.g., wNode2-wNode5). The communication node wNode6 lost the data packet and thus does not return the connection acknowledgement signal, and other communication nodes still transmit the data packet. Then, as shown in FIG. 7C, communication node wNode1 calculates the actual distances between each of the communication nodes wNode2-wNode5 and the switch node (e.g., bwRouter1 or wRouter1) according to the latitude, longitude, and altitude of each of the communication nodes wNode2-wNode5 and the switch node (e.g., bwRouter1 or wRouter1), so as to select one of the communication nodes wNode2-wNode5 based on the actual distances. In FIG. 7C, the actual distance between the communication node wNode4 and the switch node the switch node the switch node (e.g., bwRouter1 or wRouter1) is the shortest, so the communication node wNode1 connects to the communication node wNode4 and transmits the data packet to the communication node wNode4.

By repeating the data transmission method shown in FIG. 7A-FIG. 7C, the data packet is transmitted from the terminal device wTag1 to the switch node (e.g. bwRouter1 or wRouter1) quickly and accurately. Detailed operation and setting of the location-based network system 100 have been specified in the previous description and thus are not repeated hereinafter.

It should be noticed that, in FIG. 7A-FIG. 7C, the switch node may be wGateway1 and the communication nodes may be replaced by the switch node bwRouter1 or wRouter1, and the data packet is still be able to transmit to a destination node based on the data transmission method shown in the above.

In this embodiment, if the data packet is successfully transmitted to the destination node, the destination node (i.e., the switch node wGateway1) can obtain the routing path and transmit the routing path to the source node (i.e., the terminal device wTag1). The routing path can include all the communication nodes which are selected to transmit the data packet. The source node stores the routing path, and utilizes the stored routing path to transmit data packets when the source node needs to transmit data packet to the same destination node next time.

In this embodiment, if a communication node (i.e., wNode1) which sends the data packet determines that the available communication node wNode5 which is closest to the switch node (e.g., bwRouter1 or wRouter1) is congested, the communication node wNode1 select the communication node (i.e., the communication node wNode4) which is the second closest to the switch node bwRouter1 to transmit the data packet, thus balancing data flow in the location-based network system. In this embodiment, the communication node wNode1 determine whether the communication node wNode5 is congested according to a delay time of the connection acknowledge signal transmitted by the wNode5. For example, if the delay time of the connection acknowledge signal sent by the communication node wNode5 is more than a predetermined time interval, such as one second, the communication node wNode1 determines that the communication node wNode5 is congested. It should be noticed that new communication nodes can be added to ease the congestion if some of the communication nodes is congested. Also, an unmanned aerial vehicles (UAVs) can be used as a communication node or a terminal device in FIG. 7A-FIG. 7C.

Figure 8:
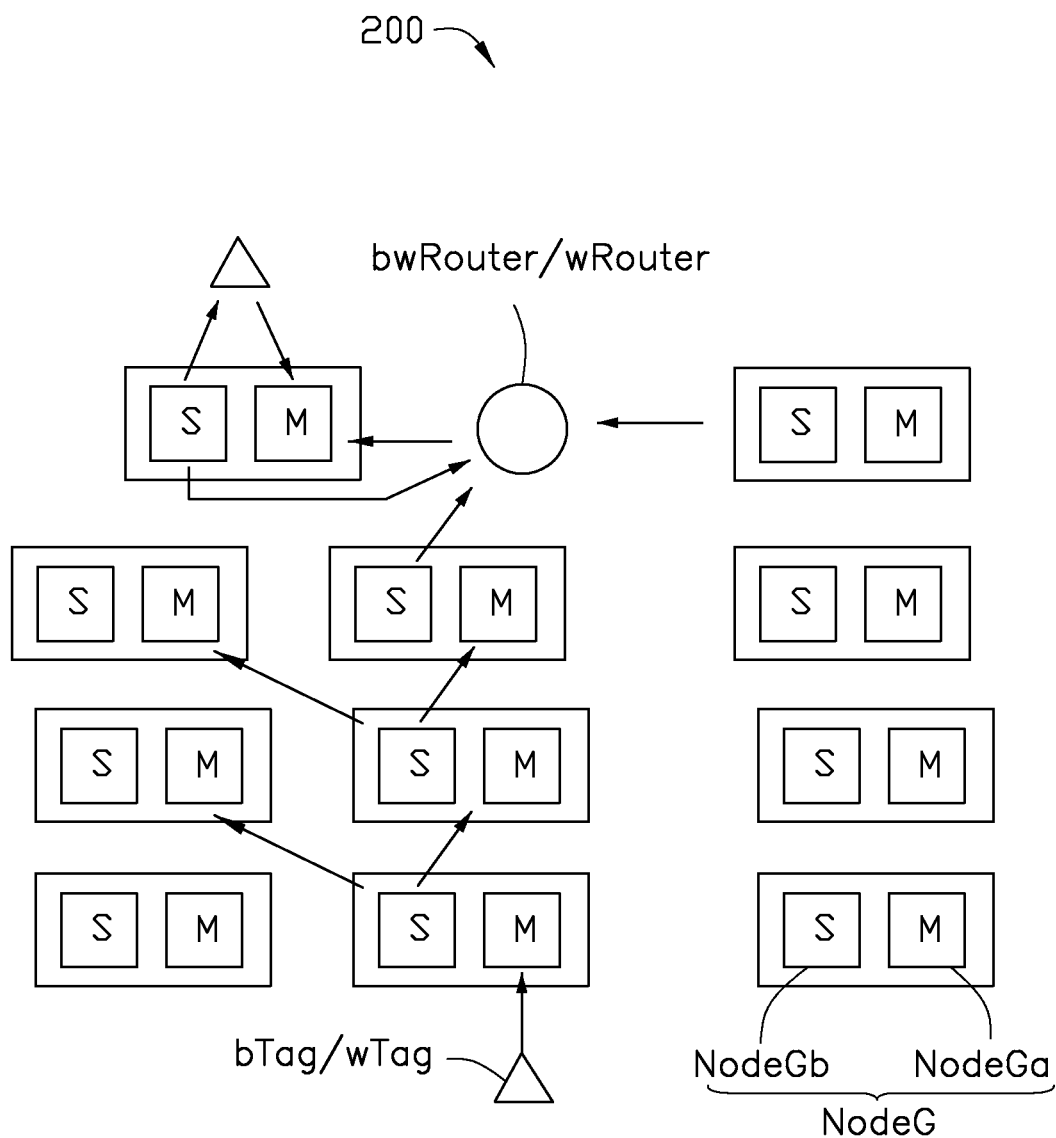
FIG. 8 is a schematic diagram illustrating a location-based network system according to a third embodiment of the present disclosure.

FIG. 8 is a schematic diagram illustrating a location-based network system according to an embodiment of the present disclosure. A location-based network system 200 of FIG. 8 is different from the location-based network system 100 of FIG. 1 in that the communication nodes bNode and wNode are replaced by a communication node group NodeG in the location-based network system 200. The communication node group NodeG includes a first sub-communication node NodeGa operating in the master mode and a second sub-communication node NodeGb operating in the slave mode. The switch node bwRouter and at least one terminal device bTag receive or transmit the data packet through the communication node group NodeG.

Apparently, the communication node group NodeG of the location-based network system 200 does not require switching between the master mode and the slave mode. When the first sub-communication node NodeGa operating in the master mode receives the data packet, the first sub-communication node NodeGa transmits the data packet to the second sub-communication node NodeGb operating in the slave mode through a UART or SPI or I2C and changes to broadcast the data packet via the second sub-communication node NodeGb. In this embodiment, the communication node group NodeG at least includes a first wireless communication module, a second wireless communication module, and a processor. Compared with the location-based network system 100 of FIG. 1, the location-based network system 200 provides higher data transmission speed.

In addition, through improvement of hardware, software and/or firmware, the communication node group NodeG can be realized into a single communication node which can simultaneously operate in the master mode and the slave mode, or operate in a master-slave coexistence mode. In other words, a single communication node can achieve the operations of the master mode and the slave mode simultaneously, such that the communication node does not need to switch between the master mode and the slave mode. More specifically, by implementing a dual-mode chip in a hardware structure (e.g., a wireless communication module) of the communication node, the communication node can perform such operation for different protocols, realizing coexistence of the master mode and the slave mode in a single communication node. Therefore, the transmission speed of the data packet is improved significantly.

Detailed operation and setting of the location-based network system 200 have been specified in the embodiment of the location-based network system 100 and thus are not repeated hereinafter.

It should be noted that, in another embodiment, the switch node bwRouter is replaced by a switch node group (not illustrated). The switch node group includes at least two sub-switch node groups, and each of the sub-switch node groups includes a first sub-switch node operating in the master mode and a second sub-switch node operating in the slave mode. For example, when the switch node group includes three sub-switch node groups, the first sub-switch nodes of the three sub-switch node groups monitor three different channels respectively. Therefore, the communication nodes bNode in the location-based network system 100 or 200 are capable of selecting different channels to broadcast the data packet, avoiding transmitting the data packet to the switch node group via the same channel, the case that may lower the data transmission speed.

For the location-based network system 100 or 200 located in a place where crowds congregate, adding new terminal devices, switch nodes, or communication nodes is simple and easy, as long as the latitudes, longitudes, and altitudes of the terminal devices, the switch nodes, or the communication nodes are set correctly. In addition, if the destination node of the data packets from different terminal devices is the same, the communication node can combine the data packets from the different terminal devices into an integrated data packet, and transmit the integrated data packet to the destination node, thus increasing transmission efficiency.

In at least one embodiment, the terminal device wTag, the communication node wNode or the switch node bwRouter, wRouter or wGateway can further identify every possible data transmission route from a source node to a destination node, for example by using the method as described in FIGS. 5A-5E, and store each of the possible data transmission route to a routing table. The terminal device wTag, the communication node wNode or the switch node bwRouter/wRouter/wGateway further identify a total number of intermediate nodes from the source node to the destination node, and calculate the length of each possible data transmission route from the source node to the destination node. Then, the terminal device wTag, the communication node wNode or the switch node bwRouter/wRouter/wGateway assigns the priority to each data transmission route according to the total number of the intermediate nodes and the length of the data transmission routes. For example, the priority of the data transmission routes can be calculated according to the following formulation:

$$X_i = \sum_{i=0}^{n} L_i + T \dots ,$$

wherein X is the priority of the data transmission route, n is the total number of intermediate nodes, L is the length of the data transmission route from the source node to the destination node, i=0, 1, 2, 3 . . . , T is the process time for intermediate nodes. So, the terminal device wTag, the communication node wNode or the switch node bwRouter, wRouter or wGateway can transmit data packets based on the priority of the data transmission routes. If the data transmission route having the highest priority is congested or broken, the data transmission route having the second highest priority will be chosen for transmission.

In an alternative embodiment, if all the possible data transmission route are determined (e.g., by using the method as described in FIG. 2A-2E), the source node (e.g., the communication node wNode, bNode or the terminal device wTag, bTag), and the destination node (e.g., the switch nodes bwRouter, wRouter or wGateway) can further calculate the distance between each intermediate nodes according to the longitudes, latitudes, and altitudes of the intermediate nodes, and calculate a total length of each data transmission route by adding up the distances between the intermediate nodes. Then, the source node or the destination node select a shortest data transmission route as the best route to transmit the data packets by utilizing a vector-based minimum-included-angle method including the following steps: generating a first vector from the source node to the destination node; generating a second vector from the source node to each of the intermediate nodes that is within a effective communication range of the source node; selecting a second vector having a minimum angle with the first vector, and determining the intermediate node forming the selected second vector with the source node as the best intermediate node to transmit a data packet received from the source node. It should be noticed that the intermediate node receiving the data packet can be regarded as a new source node after receiving the data packet from the original source node. By repeating the above steps to transmit the data packet from node to node, a best data transmission route can be determined by connecting all the best intermediate nodes. It should be noticed that the communication node can be replaced by the switch node, such as bwRouter or wRouter, to achieve best data transmission route.

In should be noticed that a location-based network system can be implemented based on the combination of the embodiments in FIG. 1 to FIG. 8, and a data transmission route will vary based on the implementation of the location-based network system having multiple meshed with different type. For example, the data packet can be transmitted in the following combined route: (1) from bTag to bNode; (2) from bNode to bwRouter; (3) from bwRouter to wNode; (4) from wNode to wRouter; and (5) from wRouter to wGateway. For another example, the data packet can be transmitted in the following combined route: (1) from bTag to bwRouter; (2) from bwRouter to another bwRouter; (3) from another bwRouter to wGateway. Also, the bwRouter can be replace by a bNode having an IP address, so the data packet can be transmitted in the following combined route: (1) from bTag to bNode; (2) from bNode to another bNode having an IP address; (3) from another bNode having an IP address to wRouter; and (5) from wRouter to wGateway. It should be noted that the data transmission path described in the above is not limited thereto.

Figure 9:
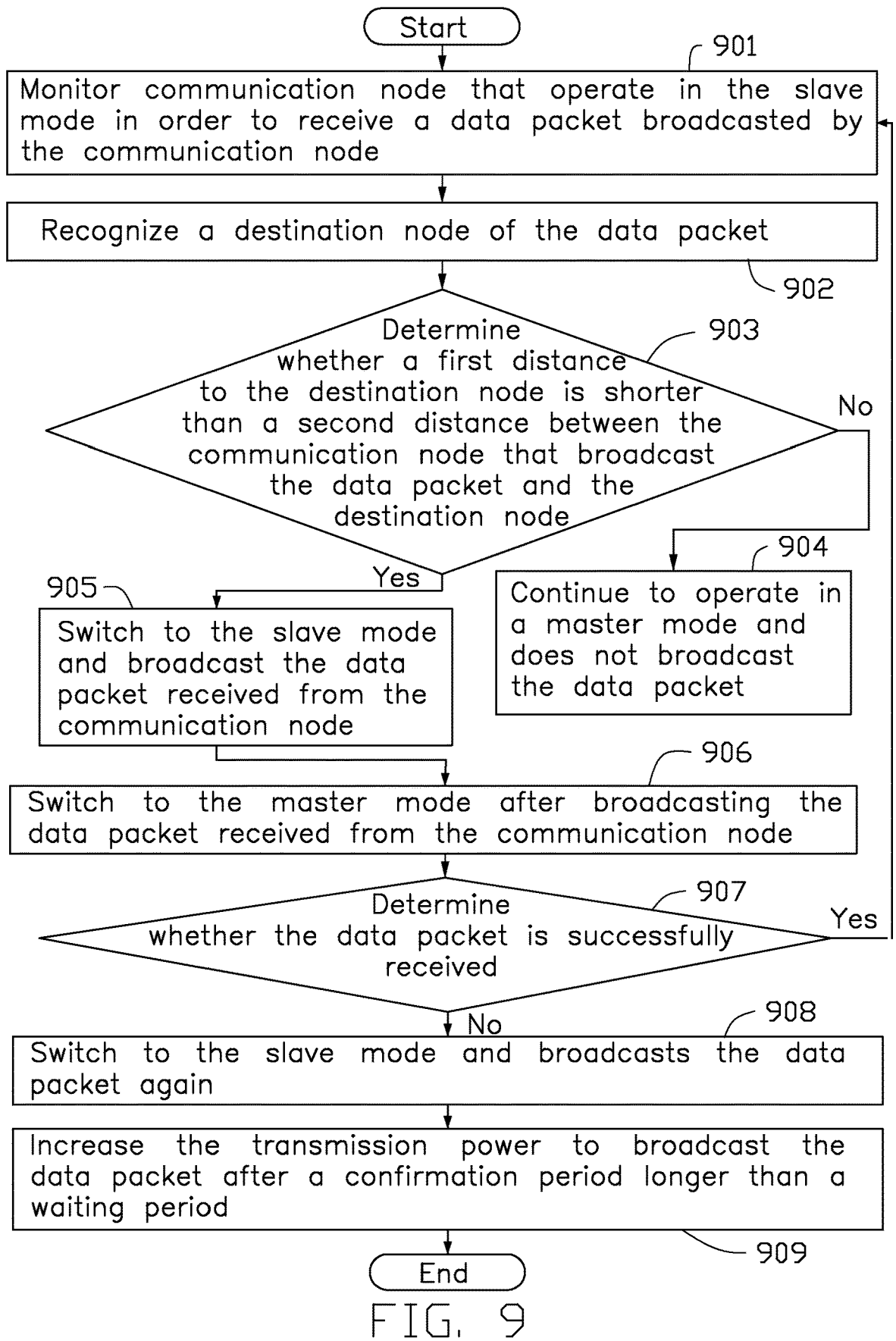
FIG. 9 is a flowchart illustrating a location-based communication method according to a first embodiment of the present disclosure.

FIG. 9 is a flowchart illustrating a location-based communication method according to an embodiment of the present disclosure. The method is provided by way of example, as there are a variety of ways to carry out the method. The method described below can be carried out using the configurations illustrated in FIG. 1 to FIG. 4H, for example, and various elements of these figures are referenced in explaining the example method. Each block shown in FIG. 9 represents one or more processes, methods, or subroutines carried out in the examplary method. Additionally, the illustrated order of blocks is by example only and the order of the blocks can be changed. The examplary method begins at block 901.

At block 901, a first communication node that operates in the master mode monitors a second communication node that operate in the slave mode in order to receive a data packet broadcasted by the second communication node.

At block 902, the first communication node recognizes a destination node of the data packet after receiving the data packet broadcasted by the second communication node that operates in the slave mode.

At block 903, the first communication node determines whether a first distance between the first communication node and the destination node is shorter than a second distance between the second communication node and the destination node according to the latitude, longitude, and altitude of each of the first communication node, the second communication node and the destination node. If no, the procedure goes to block 904; if yes, the procedure goes to block 905.

At block 904, the first communication node continues to operate in the master mode and does not broadcast the data packet.

At block 905, the first communication node switches to the slave node and broadcast the data packet received from the second communication node.

At block 906, the first communication node switches to the master mode after broadcasting the data packet received from the second communication node.

After the block 906, the method can further include a block 907: the first communication node monitors the data packet broadcasted by the second communication node that operate in the slave mode, so as to determine whether the data packet broadcasted by the first communication node is successfully received by the second communication node according to a recognition code of the data packet. If yes, the procedure goes back to block 901, if not, the procedure goes to block 908.

At block 908, the first communication node switches to the slave mode and broadcasts the data packet again.

At block 909, the first communication node increases the transmission power to broadcast the data packet after a confirmation period longer than a waiting period.

Figure 10:
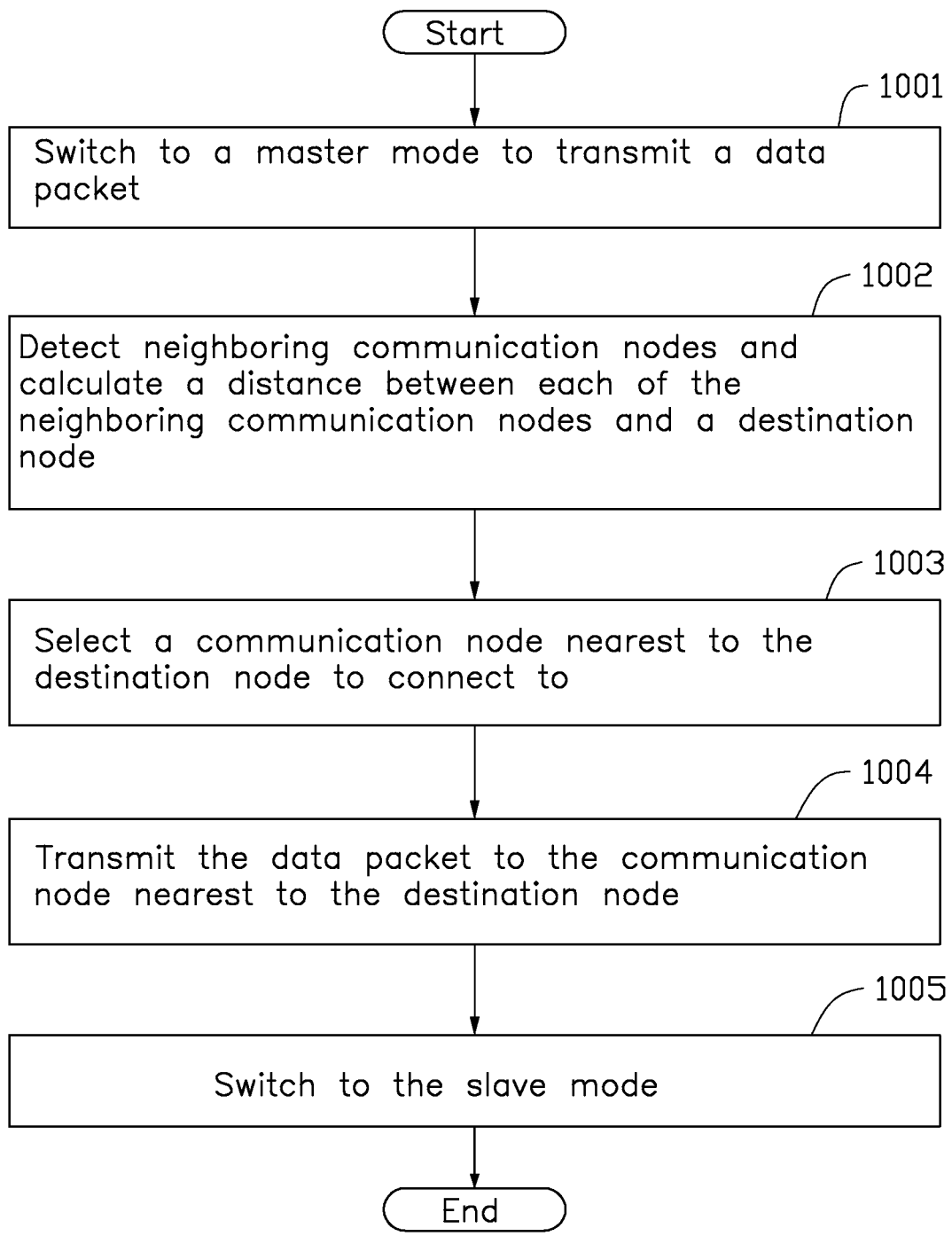
FIG. 10 is a flowchart illustrating a location-based communication method according to a second embodiment of the present disclosure.

FIG. 10 is a flowchart illustrating a location-based communication method according to a second embodiment of the present disclosure. The method is provided by way of example, as there are a variety of ways to carry out the method. The method described below can be carried out using the configurations illustrated in FIG. 5A-5G, for example, and various elements of these figures are referenced in explaining the examplary method. Each block shown in FIG. 10 represents one or more processes, methods, or subroutines carried out in the examplary method. Additionally, the illustrated order of blocks is by example only and the order of the blocks can be changed. The example method begins at block 1001. In this method, each communication node of the network system, in which the location-based communication method is applied, is operated in a slave mode in an initial state.

At block 1001, a first communication node that operates in the slave mode switches to the master mode to transmit a data packet.

At block 1002, the first communication node detects neighboring communication nodes and calculates a distance between each of the neighboring communication nodes and a destination node according to the latitude, longitude, and altitude of each of the communication nodes and the destination node.

At block 1003, the first communication node selects a communication node nearest to the destination node to connect to.

At block 1004, the first communication node transmits the data packet to the communication node nearest to the destination node.

At block 1005, the first communication node switches to the slave mode.

Figure 11:
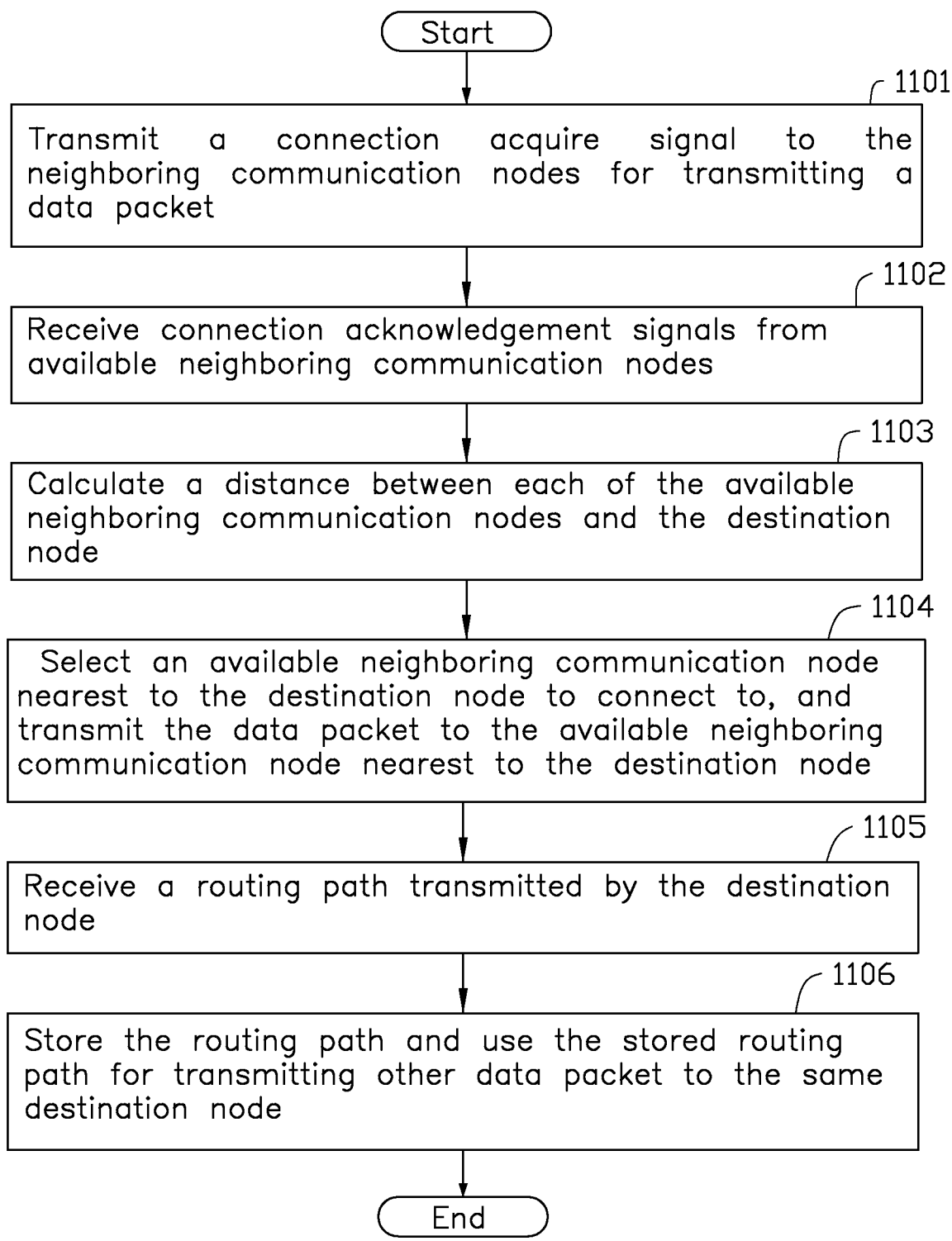
FIG. 11 is a flowchart illustrating a location-based communication method according to a third embodiment of the present disclosure.

FIG. 11 is a flowchart illustrating a location-based communication method according to a third embodiment of the present disclosure. The method is provided by way of example, as there are a variety of ways to carry out the method. The method described below can be carried out using the configurations illustrated in FIG. 7A to FIG. 7C, for example, and various elements of these figures are referenced in explaining the example method. Each block shown in FIG. 11 represents one or more processes, methods, or subroutines carried out in the examplary method. Additionally, the illustrated order of blocks is by example only and the order of the blocks can be changed. The examplary location-based communication method begins at block 1101.

At block 1101, a first communication node transmits a connection acquire signal to the neighboring communication nodes for transmitting a data packet, the connection acquire signal including the latitude, longitude, and altitude of the first communication node.

At block 1102, the first communication node receives connection acknowledgement signals from available neighboring communication nodes, each of the connection acknowledgement signals including the latitude, longitude, and altitude of the corresponding available neighboring communication node.

At block 1103, the first communication node calculates a distance between each of the available neighboring communication nodes and the destination node according to the latitude, longitude, and altitude of each of the available neighboring communication node and the destination node.

At block 1104, the first communication node selects an available neighboring communication node nearest to the destination node to connect to, and transmits the data packet to the available neighboring communication node nearest to the destination node.

After the data packet is successfully transmitted to the destination node, the method can further include one or more of the features explained below.

At block 1105, the first communication node receives a routing path transmitted by the destination node, the routing path including all the communication nodes selected to transmit the data packet.

At block 1106, the first communication node stores the routing path and uses the stored routing path for transmitting other data packet to the same destination node.

Figure 12:
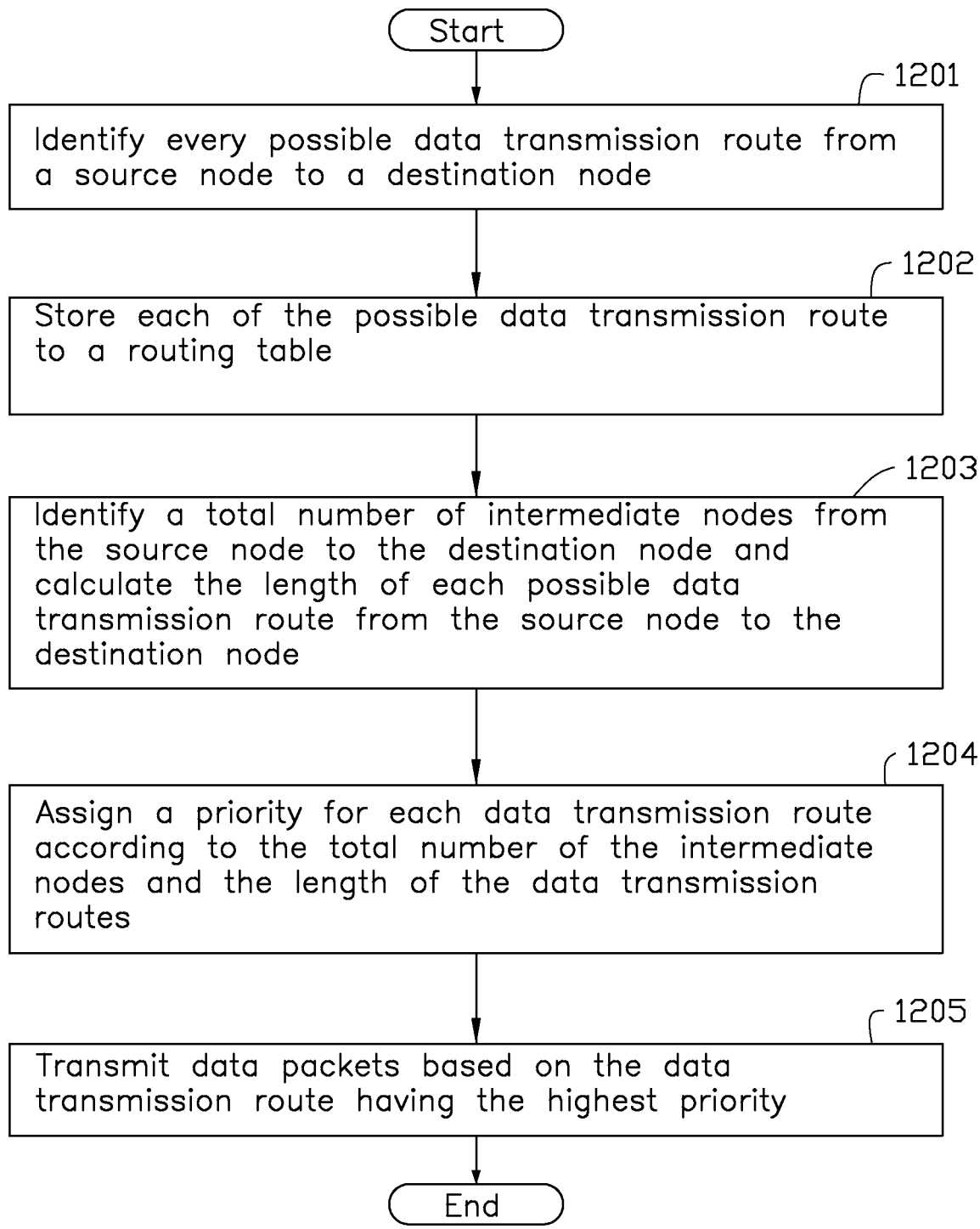
FIG. 12 is a flowchart illustrating a location-based communication method according to another embodiment of the present disclosure.

FIG. 12 is a flowchart illustrating a location-based communication method according to a forth embodiment of the present disclosure. The method is provided by way of example, as there are a variety of ways to carry out the method. The method described below can be carried out using the configurations illustrated in FIG. 1 or FIGS. 5A-5E, for example, and various elements of these figures are referenced in explaining the examplary method. Each block shown in FIG. 12 represents one or more processes, methods, or subroutines carried out in the examplary method. Additionally, the illustrated order of blocks is by example only and the order of the blocks can be changed. The examplary method begins at block 1201.

At block 1201, a terminal device, a communication node, or a switch node identifies every possible data transmission route from a source node to a destination node.

At block 1202, the terminal device, the communication node, or the switch node stores each of the possible data transmission route to a routing table.

At block 1203, the terminal device, the communication node, or the switch node identifies a total number of intermediate nodes from the source node to the destination node and calculates the length of each possible data transmission route from the source node to the destination node.

At block 1204, the terminal device, the communication node, or the switch node assigns a priority for each data transmission route according to the total number of the intermediate nodes and the length of the data transmission routes. It should be noticed that the priority of the data transmission routes can be calculated according to the following formulation:

$$X_i = \sum_{i=0}^{n} L_i + T \ldots,$$

wherein X is the priority of the data transmission route, n is the total number of intermediate nodes, L is the length of the data transmission route from the source node to the destination node, i=0, 1, 2, 3 . . . , and T is the process time for intermediate nodes.

At block 1205, the terminal device, the communication node, or the switch node transmits data packets based on the data transmission route having the highest priority.

It will be apparent to those skilled in the art that various modifications and variations can be made to the disclosed embodiments without departing from the scope or spirit of the present disclosure. In view of the foregoing, it is intended that the present disclosure covers modifications and variations provided that they fall within the scope of the following claims and their equivalents.

What is claimed is:

1. A location-based network system, comprising:
a plurality of first communication nodes, each of the first communication nodes is installed at a fixed geographic location and comprising at least one communication module and a processor, wherein a longitude, a latitude and an altitude of each first communication node are fixed and recorded in the corresponding first communication node during an installation process of installing the first communication node at the fixed geographic location;
a second communication node installed at a fixed geographic location and comprising at least one communication module and a processor, wherein the second communication node is configured to broadcast a data packet for transmitting the data packet to a destination node which is different from the first communication nodes without establishing any routing table, wherein the data packet broadcasted by the second communication node comprises a longitude, a latitude and an altitude of the second communication node and a data content, the first communication nodes and the second communication node are arranged three-dimensionally;
wherein each first communication node is configured to:
receive, by the communication module, the data packet broadcasted by the second communication node;
recognize, by the processor, the destination node of the data packet after receiving the data packet broadcasted by the second communication node;
determine, by the processor, whether a first distance between the first communication node and the destination node is shorter than a second distance between the second communication node and the destination node according to the latitude, the longitude, and the altitude of the first communication node fixed and recorded in the first communication node during the installation process, the latitude, longitude, and altitude of the second communication node comprised in the data packet, and the destination node; and
broadcast, by the communication module, the data packet received from the second communication node when it is determined by the processor that the first distance is shorter than the second distance, wherein the data packet broadcasted by the first communication node comprises the longitude, the latitude and the altitude of the first communication node fixed and recorded in the first communication node during the installation process.

2. The location-based network system according to claim 1, wherein the location-based network system further comprises a switch node and a terminal device communicating via the communication nodes.

3. The location-based network system according to claim 2, wherein the switch node is further connected to a cloud network platform and uploads the received data packet to the cloud network platform or receives another data packet from the cloud network platform.

4. The location-based network system according to claim 2, wherein the terminal device has the function of RFID or visible light communication.

5. The location-based network system according to claim 2, wherein the terminal device is an unmanned aerial vehicle.

6. The location-based network system according to claim 1, wherein the second communication node is further configured to:
determine, by the processor, whether the data packet is received by the communication module of the second communication node in a waiting period greater than zero after the second communication node broadcasts the data packet; and
broadcast, by the communication module, the data packet again when it is determined by the processor that the data packet is not received by the communication module of the second communication node in the waiting period after the second communication node broadcasts the data packet.

7. The location-based network system according to claim 1, wherein the second communication node is further configured to:
determine, by the processor, whether the data packet is received by the communication module of the second communication node in a confirmation period greater than zero after the second communication node broadcasts the data packet; and
increase transmission power, and broadcast, by the communication module, the data packet again in the increased transmission power when it is determined by the processor that the data packet is not received by the communication module of the second communication node in the confirmation period after the second communication node broadcasts the data packet.

8. The location-based network system according to claim 1, wherein the second communication node is further configured to:
- determine, by the processor, whether the data packet is received by the communication module of the second communication node in a confirmation period greater than zero after the second communication node broadcasts the data packet; and
- activate a warning light when it is determined by the processor that the data packet is not received by the communication module of the second communication node in the confirmation period after the second communication node broadcasts the data packet.

9. A location-based network system, comprising:
a plurality of communication nodes, each of the communication nodes is installed at a fixed geographic location and comprising at least one communication module and a processor, wherein a longitude, a latitude and an altitude of each communication node are fixed and recorded in the corresponding communication node during an installation process of installing the corresponding communication node at the fixed geographic location, the plurality of communication nodes are arranged three-dimensionally;
wherein a first communication node in the plurality of communication nodes is configured to:
transmitting a data packet which is initiated by a source node which is different from the first communication node to a destination node without establishing any routing table, wherein the data packet broadcasted by the first communication node comprising the longitude, the latitude, and the altitude of the first communication node fixed and recorded in the first communication node during the installation process and a data content;
detect neighboring communication nodes and calculate a distance between each of the neighboring communication nodes and the destination node according to the latitude, the longitude, and the altitude of each of the communication nodes and the destination node; and
transmit the data packet to the neighboring communication node nearest to the destination node.

10. The location-based network system according to claim 9, wherein the location-based network system further comprises a switch node and a terminal device communicating via the communication nodes.

11. The location-based network system according to claim 10, wherein the switch node is further connected to a cloud network platform and uploads the received data packet to the cloud network platform or receives another data packet from the cloud network platform.

12. The location-based network system according to claim 10, wherein the terminal device has the function of RFID or visible light communication.

13. The location-based network system according to claim 10, wherein the terminal device is an unmanned aerial vehicle.

14. A location-based network system, comprising:
a plurality of communication nodes, each of the communication nodes is installed at a fixed geographic location and comprising at least one communication module and a processor, wherein a longitude, a latitude and an altitude of each communication node are fixed and recorded in the corresponding communication node during an installation process of installing the corresponding communication node at the fixed geographic location, the plurality of communication nodes are arranged three-dimensionally;
wherein a first communication node in the plurality of communication nodes is configured to:
transmit a connection acquire signal to the neighboring communication nodes for transmitting a data packet from a source node which is different from the first communication node to a destination node without establishing any routing table, the connection acquire signal including the latitude, the longitude, and the altitude of the first communication node fixed and recorded in the first communication node during the installation process;
receive connection acknowledgement signals from the available neighboring communication nodes in the plurality of communication nodes, each of the connection acknowledgement signals including the latitude, the longitude, and the altitude of the corresponding available neighboring communication node;
calculate a distance between each of the available neighboring communication nodes and the destination node according to the latitude, the longitude, and the altitude of each of the available neighboring communication node and the destination node;
select an available neighboring communication node nearest to the destination node to connect to, and broadcast the data packet to the available neighboring communication node nearest to the destination node, wherein the data packet broadcasted by the first communication node comprises a longitude, a latitude and an altitude of the first communication node fixed and recorded in the first communication node during the installation process and a data content.

15. The location-based network system according to claim 14, wherein the first communication node receives a routing path transmitted by the destination node, the routing path including all the communication nodes selected to transmit the data packet after the data packet is successfully transmitted to the destination node, and stores the routing path and uses the stored routing path for transmitting other data packet to the same destination node.

16. The location-based network system according to claim 14, wherein the location-based network system further comprises a switch node and a terminal device communicating via the communication nodes.

17. The location-based network system according to claim 16, wherein the switch node is further connected to a cloud network platform and uploads the received data packet to the cloud network platform or receives another data packet from the cloud network platform.

18. The location-based network system according to claim 16, wherein the terminal device has the function of RFID or visible light communication.

19. The location-based network system according to claim 16, wherein the terminal device is an unmanned aerial vehicle.

* * * * *